(12) United States Patent
Jackson

(10) Patent No.: US 10,348,426 B2
(45) Date of Patent: Jul. 9, 2019

(54) APPARATUS, SYSTEMS AND METHODS FOR IDENTIFYING PARTICULAR MEDIA CONTENT EVENT OF INTEREST THAT IS BEING RECEIVED IN A STREAM OF MEDIA CONTENT

(71) Applicant: EchoStar Technologies L.L.C., Englewood, CO (US)

(72) Inventor: Robert J. V. Jackson, Englewood, CO (US)

(73) Assignee: DISH Technologies L.L.C., Englewood, CO (US)

(*) Notice: Subject to any disclaimer, the term of this patent is extended or adjusted under 35 U.S.C. 154(b) by 1196 days.

(21) Appl. No.: 14/508,821

(22) Filed: Oct. 7, 2014

(65) Prior Publication Data
US 2016/0099787 A1 Apr. 7, 2016

(51) Int. Cl.
| | |
|---|---|
| *H04N 21/231* | (2011.01) |
| *H04N 21/234* | (2011.01) |
| *H04N 21/235* | (2011.01) |
| *H04N 21/2389* | (2011.01) |
| *H04N 21/4402* | (2011.01) |
| *H04N 21/458* | (2011.01) |
| *H04H 60/37* | (2008.01) |
| *H04N 21/44* | (2011.01) |
| *H04N 21/81* | (2011.01) |
| *H04H 20/10* | (2008.01) |

(Continued)

(52) U.S. Cl.
CPC .... *H04H 60/375* (2013.01); *H04N 21/44008* (2013.01); *H04N 21/812* (2013.01); *H04H 20/10* (2013.01); *H04N 21/4542* (2013.01); *H04N 21/8456* (2013.01)

(58) Field of Classification Search
None
See application file for complete search history.

(56) References Cited

U.S. PATENT DOCUMENTS

2004/0268387 A1* 12/2004 Wendling ............. H04N 5/4401
725/35
2007/0053513 A1* 3/2007 Hoffberg ............ G06K 9/00369
380/201

(Continued)

*Primary Examiner* — Brian T Pendleton
*Assistant Examiner* — Jean D Saint Cyr
(74) *Attorney, Agent, or Firm* — Lowe Graham Jones PLLC; Raymond Armentrout

(57) ABSTRACT

Obscuring systems and methods are operable to obscure an intervening content segment that a user does not wish to view and/or listen to if that particular intervening content segment is again received at a later time. An exemplary embodiment includes at least a content segment obscuring system that samples the decoded stream of information corresponding to an initial portion of the intervening content segment, determines a vector signature of the sampled initial portion of the intervening content segment, wherein the vector signature corresponds to at least one location and an orientation of a vector in a multi-dimensional vector space, and compares the vector signature with a plurality of predefined reference vector signatures. In response to the vector signature substantially corresponding to at least one of the plurality of predefined reference vector signatures, the intervening content segment is obscured with replacement content.

20 Claims, 4 Drawing Sheets

(51) Int. Cl.
*H04N 21/454* (2011.01)
*H04N 21/845* (2011.01)

(56) References Cited

U.S. PATENT DOCUMENTS

| | | | |
|---|---|---|---|
| 2008/0005770 A1* | 1/2008 | Acharya | H04N 5/76 |
| | | | 725/101 |
| 2013/0301916 A1* | 11/2013 | Conradt | G06K 9/00711 |
| | | | 382/173 |
| 2017/0128137 A1* | 5/2017 | Qureshi | G06T 7/246 |

* cited by examiner

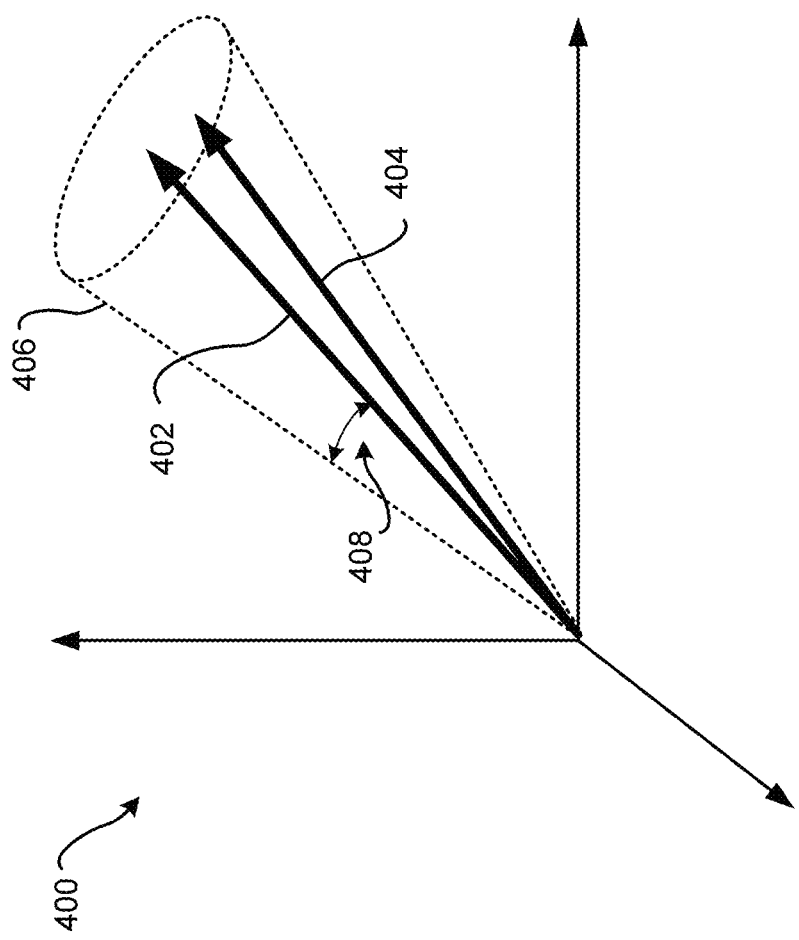

APPARATUS, SYSTEMS AND METHODS FOR IDENTIFYING PARTICULAR MEDIA CONTENT EVENT OF INTEREST THAT IS BEING RECEIVED IN A STREAM OF MEDIA CONTENT

BACKGROUND

Media content may be received at a media device in a streaming fashion. The media device may receive the stream of media content from a content source via a particular communication medium. Such communication mediums include, but are not limited to, the Internet, a terrestrial broadcast over-the-air signal, a broadcast satellite signal, a wire-based signal (i.e., a signal communicated via a cable system or a telephony system).

Typically, the streaming media content comprises different media content events that are presented to the user in a serial fashion on a display coupled to, or that is part of, the receiving media device. Generally, the user of the media device is interested in viewing a particular media content event of interest, such as a movie, a serial program, a sporting event, a news program, or the like. Such media content events are typically theme-based, and are provided with the intent of entertaining the user who is viewing the presented media content event on the display.

Interspersed between segments of the media content event of interest may be other intervening content segments that are unrelated to the particular media content event of interest that the user has selected for viewing. Examples of such other intervening content segments include a commercial, an infomercial, an advertisement, or a promotion, defined hereinafter as an intervening content segment. Typically, the theme of an intervening content segment is not related to the theme of the media content event of interest that the user has selected for viewing. Rather, the themes of these intervening content segments are often intended to inform the user about a product and/or service that may be available to the user, and/or may be an attempt to educate the user about a particular topic of interest. Further, these intervening content segments are intended to influence and/or coerce the user into purchasing the product and/or service that is being advertised in the intervening content segment, and/or to influence an opinion of the user who is viewing the intervening content segment. (Accordingly, an intervening content segment is defined herein as a content segment that intervenes between portions of a media content event of interest, wherein the theme of the intervening content segment is different form a theme of the media content event of interest, and wherein the duration of the intervening content segment is relatively shorter than the duration of the adjacent portions media content event of interest.)

In some situations, such intervening content segments may be distracting to the user, thereby complicating the process of following the theme of the media content event of interest that the user has selected for viewing. Accordingly, the user may not be interested in viewing the intervening content segments that are interspersed between segments of the media content event of interest that the user has selected for viewing.

Many systems have been devised to attempt to block, replace, and/or skip over (fast forward over) presentation of these intervening content segments. A significant barrier to blocking, replacing or skipping over the presentation of intervening content segments is the need to identify an intervening content segment before, or just as, the intervening content segment begins to be presented on the display. Thus, the intervening content segment needs to be identified from the segments of the media content event of interest as that particular intervening content segment is being received in the media content stream.

Some legacy systems rely on an identifier or the like that is included in each intervening content segment. However, such legacy systems have been thwarted in the effort to block, replace, and/or skip over the intervening content segment (e.g., advertisement) because the organizations associated with the intervening content segment have paid a premium to the provider of the media content stream to have their intervening content segment (advertisement or the like) presented to the user.

Thus, there is a need in the art to provide an improved method and system that blocks, replaces, and/or skips over undesirable intervening content segments that are interspersed between segments of the media content event of interest that the user has selected for viewing.

SUMMARY

Systems and methods of obscuring an intervening content segment are disclosed. An exemplary embodiment includes at least a content segment obscuring system that samples the decoded stream of information corresponding to an initial portion of the intervening content segment, determines a vector signature of the sampled initial portion of the intervening content segment, wherein the vector signature corresponds to at least one of a location and an orientation of a vector in a multi-dimensional vector space, and compares the vector signature with a plurality of predefined reference vector signatures. In response to the vector signature substantially corresponding to at least one of the plurality of predefined reference vector signatures, the intervening content segment is obscured with replacement content.

BRIEF DESCRIPTION OF THE DRAWINGS

Preferred and alternative embodiments are described in detail below with reference to the following drawings:

FIG. 4 is a conceptual diagram of a reference vector and a sample vector in a three-dimensional vector space.

DETAILED DESCRIPTION

Figure 1:
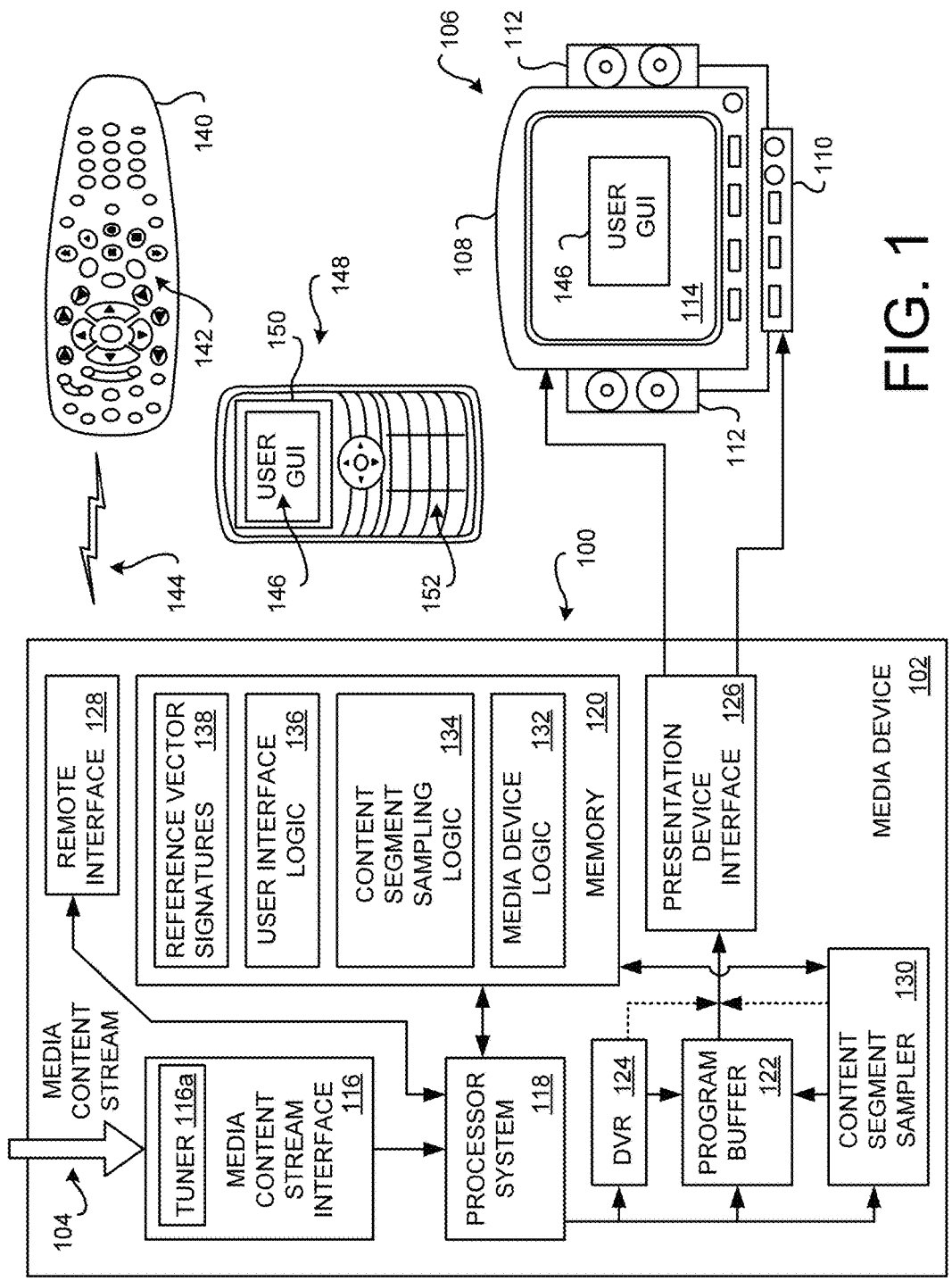
FIG. 1 is a block diagram of an embodiment of a content segment obscuring system.

FIG. 1 is a block diagram of an embodiment of the content segment obscuring system 100. An exemplary embodiment of the content segment obscuring system 100 detects presence of at least one intervening content segment that is to be obscured. Then, embodiments of the content segment obscuring system 100 obscure presentation of the identified content segment so that a user does not have to view and/or hear the obscured intervening content segment. An intervening content segment that is to be obscured is defined herein as an "obscured intervening content segment" for brevity.

In the various embodiments, the obscured intervening content segment may be obscured in a variety of manners. In the various embodiments, obscuring is defined as modifying the video and/or audio information of the obscured intervening content segment such that the user does not have to view and/or listen to the obscured intervening content segment that has been interspersed between segments of the media content event of interest that the user has selected for viewing. For example, the video portion and/or the audio portion of an advertisement or the like (i.e., the obscured intervening content segment) may not be presented to the user, or may be replaced with alternative video and/or audio content.

Embodiments of the content segment obscuring system 100 define a vector signature for at least an initial portion of each of the serially received content segments of the received media content stream. A vector signature is a vector is defined by a sample of data in a multi-dimensional vector space, such as two dimensions, three dimensions, or more than three dimensions. The vector of the vector signature has a location and/or orientation in the multi-dimensional vector space.

The location and/or orientation of a determined vector in the multi-dimensional vector space that is associated with an initial portion of one of the received content segments. That is, a sample of an initial portion of a received content segment is taken, and a vector signature defined therefrom. The term vector is interchangeably referred to as a vector signature hereinafter.

The location and/or orientation of the determined vector signature is compared with the location and/or orientation of a plurality of other reference vector signatures that have been previously determined from samples of initial portions of other intervening content segments that a user or another party has previously identified for obscuring (since the user does not wish to view and/or listen to those intervening content segments if they are again received at a later time).

If the location and/or orientation of the determined vector signature of the currently sampled initial portion of the intervening content segment corresponds to a location and/or orientation of a vector associated with of one of the plurality of predefined reference vector signatures, the respective intervening content segment is defined as an obscured intervening content segment that the user does not wish to view and/or listen to at a later time. That is, if a newly received intervening content segment that is being analyzed has a vector signature that is the same, or that is substantially the same as, a reference vector signature of a previously identified obscured intervening content segment, then the identified intervening content segment is most likely the same as the previously identified obscured intervening content segment. Accordingly, that intervening content segment is defined as an obscured intervening content segment, and embodiments of the content segment obscuring system 100 can then obscure that particular intervening content segment from presentation to the user. Here, the phrases "corresponding to" and/or "substantially corresponding to" is defined as a vector signature (defined by a reference vector) that is located and/or orientated in a multi-dimensional vector space that is within a cone about a location and/or orientation of the reference vector signature, wherein the cone is defined by a half angle about some predefined fixed angle. A later time is appreciated to be any time and/or date after the user selection is made.

An example embodiment of the content segment obscuring system 100 employs an artificial neural network (ANN) approach to identifying received intervening content segments that are to be obscured. Such embodiments employ machine learning techniques and pattern recognition techniques to rapidly identify a received content segment, and then determine if that intervening content segment is to be obscured. Any suitable ANN technique may be used in the various embodiments. Further, alternative embodiments may employ other learning and/or pattern recognition techniques for identifying received intervening content segments that are to be obscured.

As illustrated in FIG. 1, an example content segment obscuring system 100 resides in, and is operable to control, a media device 102. The example media device 102 may be, but is not limited to, a set top box (STB). Embodiments of the content segment obscuring system 100 may be implemented in other media devices, such as, but not limited to, stereos, surround-sound receivers, radios, televisions (TVs), digital video disc (DVD) players, digital video recorders (DVRs), cellular phones equipped with video functionality, smart phones, tablets, personal device assistants (PDAs), game playing devices, or personal computers (PCs) that are configured to present a media content event of interest that is received in a media content stream 104.

The exemplary media device 102 is communicatively coupled to a media presentation system 106 that includes a visual display device 108, such as a television (hereafter, generically a TV), and an audio presentation device 110, such as a surround sound receiver controlling an audio reproduction device 112 (hereafter, generically, a speaker 112). In some applications the visual display device 108 and the audio presentation device 110 are integrated together into a single device, or are implemented as components of the media device 102. Other types of output devices may also be coupled to the media device 102, including those providing any sort of stimuli sensible by a human being, such as temperature, vibration and the like. The video portion of a received content segment of content received in the media content stream 104 is displayed on the display 114. The audio portion of the received content segment is reproduced as sounds by one or more of the speakers 112.

The non-limiting exemplary media device 102 comprises a media content stream interface 116, a processor system 118, a memory 120, a program buffer 122, an optional digital video recorder (DVR) 124, a presentation device interface 126, a remote interface 128, and an optional content segment sampler 130. The memory 120 comprises portions for storing the media device logic 132, and the content segment sampling logic 134, the user interface logic 136, and the reference vector signatures 138. In some embodiments, the media device logic 132, and the content segment sampling logic 134, and/or the user interface logic 136 may be integrated together, and/or may be integrated with other logic. In other embodiments, some or all of these memory and other data manipulation functions may be provided by and using remote server or other electronic devices suitably connected via the Internet or otherwise to a client device. Other media devices may include some, or may omit some, of the above-described media processing components. Further, additional components not described herein may be included in alternative embodiments.

The functionality of the media device 102, here exemplified in a STB, is now broadly described. A media content provider provides streaming media content that is received at the media device 102. In some embodiments, the streaming media content is received in one or more multiple media content streams 104 multiplexed together in one or more transport channels. The transport channels with the media content streams 104 are communicated to the media device 102 from a media system sourced from a remote head end facility (not shown) operated by the media content provider. Non-limiting examples of such media systems include satellite systems, cable systems, radio frequency (RF) communication systems, memory mediums, and the Internet. For example, if the media content provider provides programming via a satellite-based communication system, the media device 102 is configured to receive one or more broadcasted satellite signals detected by an antenna (not shown).

The media content stream 104 received at the media device 102 comprises the theme-based media content event of interest that the user has selected for viewing. In many situations, the media content event is segmented into a series of content segments. Other intervening content segments are interspersed between segments of the media content event of interest that the user has selected for viewing. Examples of such other intervening content segments include, but are not limited to, a commercial, an infomercial, an advertisement, or a promotion. A theme of the intervening content segment typically is not related to the theme of the media content event of interest that the user has selected for viewing. For example, the theme of an advertisement is intended to inform the user about a product and/or service that may be available to the user. Typically, such advertisements are intended to influence and/or coerce the user into purchasing the product and/or service that is being advertised in the advertisement. If the user indicates that they do not wish to have a particular intervening content segment (such as an advertisement) presented to them, embodiments of the content segment obscuring system 100 identify the occurrence of the specified intervening content segment in the received media content stream 104 as an obscured intervening content segment, and then obscure presentation of the identified obscured intervening content segment (i.e., the intervening content segment whose vector signature corresponds to, or substantially corresponds to, a stored reference vector signature of a predefined obscured intervening content segment).

In practice, one or more media content streams 104 are received by the media content stream interface 116. In an example embodiment, one or more tuners 116a in the media content stream interface 116 selectively tune to one of the media content streams 104 in accordance with instructions received from the processor system 118. As noted above, interspersed between segments of the media content event of interest may be other intervening content segments.

During operation, the processor system 118, executing the media device logic 132 and based upon a request for a media content event of interest specified by a user, parses out the streaming media content associated with the media content event of interest. The content segments of the media content event of interest, along with any intervening content segments, are then decoded and assembled into a stream of video and/or audio information processor system 118 that is then communicated out to other components of the media device 102. This decoded stream of video and/or audio information is temporarily stored, or cached, by the program buffer 122 such that a stream of media content information can be streamed out to components of the media presentation system 106. Non-limiting examples of the components of the media presentation system 106 include the visual display device 108 and/or the audio presentation 110. The stream of video and/or audio information is communicated to the components of the media presentation system 106 via the presentation device interface 126. In some embodiments, components of the media presentation system 106 illustrated in FIG. 1 may be integrated into the media device 102.

Alternatively, or additionally, the decoded stream of video and/or audio information may be saved into the DVR 124 for later presentation. The DVR 124 may be directly provided in, locally connected to, or remotely connected to, the media device 102. In alternative embodiments, the media content streams 104 may be stored for later decompression, processing and/or decryption. In embodiments that save the decoded stream of video and/or audio information into the DVR 124, the content segment obscuring system 100 may be deactivated so that the saved stream of media content is not sampled. The sampling of the media content to identify obscured intervening content segments may then be optionally performed as the content is being retrieved from the DVR 124. Alternatively, the content segment obscuring system 100 may be activated so that the saved stream of content is sampled prior to storing the content into the DVR 124. The sampling of content prior to storing identifies obscured intervening content segments so that such identified obscured intervening content segments can be obscured prior to storing the content into the DVR 124.

The example media device 102 may be configured to receive commands from a user via a remote control 140. The remote control 140 includes one or more controllers 142 disposed on the surface of the remote control 140. The user, by actuating one or more of the controllers 142, causes the remote control 140 to generate and transmit commands, via a wireless signal 144, to the media device 102. The communicated commands residing in the wireless signal 144 are configured to control the media device 102 and/or control components of the media presentation system 106. The wireless signal 144 may be an infrared (IR) signal or a radio frequency (RF) signal that is detectable by the remote interface 128.

The processes performed by the media device 102 relating to the processing of the received media content stream 104 and communication of a presentable media content event to the components of the media presentation system 106 are generally implemented by the processor system 118 while executing the media device logic 132. Thus, the media device 102 may perform a variety of functions related to the processing and presentation of one or more media content events, and any other intervening content segments, which are received in the media content stream 104.

As the stream of media content is being presented to the user by the components of the media presentation system 106, one or more intervening content segments from time to time will be presented between segments of the of the media content event of interest that the user has selected for viewing. When a particular intervening content segment is being currently presented to the user, the user may decide that they do not wish to see this particular intervening content segment at a later date. That is, at an earlier time before the stream of media content stream 104 with the intervening content segment is received at the media device, the user provides a specification to the media device 102 to indicate that the currently presented intervening content segment is a segment that is to be obscured if that particular intervening content segment is later received in the media content stream 104. That is, the user specification causes the content segment obscuring system 100 to define the user-specified intervening content segment as an obscured intervening content segment.

Embodiments of the content segment obscuring system 100 are configured to receive the user's specification that a particular intervening content segment is to be obscured if presented at a later time. The selected intervening content segment is identified as an obscured intervening content segment. The vector signature (the location and/or orientation in the multi-dimensional vector space) is determined for the sampled initial portion of that selected intervening content segment, and is then saved into the reference vector signatures 138. Accordingly, any vector signature that is saved into the reference vector signatures 138 as a reference vector signature can later be used to identify instances when that particular intervening content segment is again received at the media device 102.

To provide for user selection of an intervening content segment for obscuring, an example embodiment presents a user graphical user interface (GUI) 146 on the display 114 to the user (not shown). The user may use the remote control 140 to navigate about the user GUI 146 to select a button, portion, or the like that is presented on the user GUI 146 that is configured to identify and/or select the particular intervening content segment is being presented to the user. Then, in response to selection by the user via the presented user GUI 146, that particular currently presented intervening content segment is identified as an obscured intervening content segment. Any suitable form of the GUI 146 may be used by the various embodiments.

Alternatively, or additionally, one or more of the controllers 142 on the remote control 140 may be designated to automatically identify an obscured intervening content segment. That is, upon actuation of one or more of the controllers 114234, in response to actuation of the one or more controllers 142 by the user, that particular currently presented intervening content segment is identified as an obscured intervening content segment.

Alternatively, or additionally, the user may select a currently presented intervening content segment using another electronic device 148 that is communicatively coupled to the media device 102. For example, a representative of the electronic device 148 illustrated in FIG. 1 includes, but is not limited to, a smart phone, a cell phone, or the like. The exemplary electronic device 148 includes a display 150 and a plurality of controllers 152 thereon. An example embodiment presents a suitable user GUI 146 on the display 150 of the electronic device 148. The user may navigate about the user GUI 146 to select a button, portion, or the like that is presented on the user GUI 146 as the particular intervening content segment is being presented. Alternatively, or additionally, one or more of the controllers 152 of the electronic device 148 may be designated to automatically specify an obscured intervening content segment. Then, in response to selection by the user via the presented user GUI 146, a selection signal is communicated from the electronic device 148 to the media device 102. In response to receiving the selection signal, that particular currently presented intervening content segment is identified as an obscured intervening content segment.

The electronic device 148, in some embodiments, may be in direct communication with the media device 102. For example, the electronic device 148 may use the same communication medium as the remote control 140, such as an infrared medium or a low power, short range RF medium. Alternatively, or additionally, the electronic device 148 may communicate with the media device through an intervening communication system, such as a wireless cellular phone communication system, telephony system, the Internet, and/or other suitable back channel system that the media device 102 is coupled to.

In some embodiments, the user may be provided an opportunity to select the presented intervening content segment to prevent future re-presentation after a conclusion of the presented intervening content segment. That is, after viewing the intervening content segment, the user may then decide that they do not wish to see this particular intervening content segment at a later time after they are done viewing and/or listening to that particular intervening content segment. Accordingly, embodiments of the content segment obscuring system 100 temporarily save or store the determined vector signature that is associated with the initial portion each intervening content segment for some predefined duration of time (referred to herein as a holdover duration). If the user provides a selection identifying the just-presented intervening content segment after the conclusion of the presented intervening content segment, but before expiration of the predefined duration of time, than that completed intervening content segment is then identified as an obscured intervening content segment. The vector signature, and optionally an identifier, of the intervening content segment being presented is then saved in the memory 120, in the program buffer 122, or in another suitable memory medium. After expiration of the predefined duration, the vector signature (and the identifier if saved) of the completed intervening content segment may be erased, deleted or otherwise discarded since the user has not selected that particular intervening content segment for obscuring if again presented at a later time.

During the above-described holdover duration, the vector signature of the next and currently presented intervening content segment is determined from the initial portion of that currently presented intervening content segment. This determined vector signature is temporarily saved, stored and/or buffered for some predefined duration (such as until expiration of the additional holdover duration) in any suitable memory medium, such as, but not limited to, the example memory 120. After expiration of the holdover duration, the vector signature (and optionally the identifier) of the next presented intervening content segment may be saved or used to overwrite the vector signature (and optionally the identifier) of the previously presented intervening content segment. If the user selects this currently presented intervening content segment for obscuring, then the vector signature may be then saved into the reference vector signatures 138.

As noted above, the media content stream 104 received at the media device 102 comprises the media content event of interest that the user has selected for viewing. This media content event may be segmented into a series of content segments. Other intervening content segments are interspersed between the segments of the media content event of interest. As a first step in the process of identifying a received intervening content segment as being a content segment that is to be obscured if later received at the media device 102, embodiments of the content segment obscuring system 100 continuously and periodically sample the information in the media content stream. In the various embodiments, the content segments of the media content event of interest and the plurality of intervening content segments are sampled. That is, the decoded stream of video and/or audio information is continuously and periodically sampled by the content segment obscuring system 100. Accordingly, the sampling includes the content segments of the media content event of interest and the plurality of intervening content segments.

The duration of a sampled portion provides sufficient information to determine a vector signature for each sampled portion. Accordingly, the periodic sampling is performed at a rate (frequency) that is sufficiently fast such that a vector signature for an initial portion of each intervening content segment can be identified. That is, the sampling rate must be fast enough to permit the initial portion of the currently received intervening content segment that is being sampled to be reliably discerned from the end (concluding portion) of a previously received content segment (or another previously received intervening content segment), and must be fast enough to permit the initial portion of the sampled intervening content segment to be reliably discerned from later sampled portions of the currently intervening content segment. Accordingly, any particular received intervening content segment will be sampled many, many times.

In example embodiments of the content segment obscuring system 100, the decoded stream of video and/or audio information that is output from the processor system 118 is provided to the content segment sampler 130. The decoded stream of video and/or audio information may be received at the content segment sampler 130 before the decoded stream of video and/or audio information is received at the program buffer 122 (and/or at the DVR 124). In other embodiments, the decoded stream of video and/or audio information may be received at the content segment sampler 130 concurrently, or even after, the stream of video and/or audio information is received at the program buffer 122 (and/or at the DVR 124). However, in each situation above, the sampling of the portions of the decoded stream of video and/or audio information is completed such that the vector signature for the initial portion of a currently sampled intervening content segment is identified prior to communication of that intervening content segment from the presentation device interface 126 to the media presentation devices 106. In the event that the determined vector signature of the identified initial portion of a sampled intervening content segment corresponds to, or substantially corresponds to, a reference vector signature determined for a previously specified obscured intervening content segment, then the content segment sampler 130 can operate the media device 102 to obscure the current intervening content segment (now an identified obscured intervening content segment) as, or even before, the obscured intervening content segment is communicated out from the program buffer 122 and/or from the presentation device interface 126. That is, once the initial portion of the current intervening content segment indicates that the current intervening content segment is to be obscured, embodiments of the content segment obscuring system 100 prevent presentation of that identified intervening content segment by the media presentation system 106.

In some embodiments, a plurality of users may from time to time be using the media device 102. Such different users may have different preferences for which particular intervening content segments that they do not wish to again view and/or listen to at a later time. That is, the reference vector signatures may be different depending upon the particular user who is currently operating the media device 102.

For example, "father" may not particularly wish to see repetitions of intervening content segments related to advertisements of cosmetics. On the other hand, "mother" may not be interested in seeing repetitions of intervening content segment related to upcoming sporting events. Accordingly, embodiments of the content segment obscuring system 100 may be configured to distinguish between users, and then only obscure intervening content segments for particular users.

In such embodiments, a suitable identifier of one or more different users is associated with at least one of the stored reference vector signatures. For example, the identifier of a user may be stored as a header or the like of a data file that defines the reference vector signature. Alternatively, a relational data base may be used to associate individual users with their selected intervening content segments that they do not wish to view and/or listen to at a later time.

During the process of specifying intervening content segments for obscuring, the particular user making the specification may identify themselves via their remote control 140 and/or the presented user GUI 146. In an example embodiment, the user enters their name, user code, or other suitable identifier before, during, or after the specification of an intervening content segment for obscuring. The determined vector signature (now a reference vector signature) and the corresponding user identifier may then be saved. If multiple users select the same intervening content segment for obscuring, the multiple user identifiers may be saved with or associated with the determined vector signature (now a reference vector signature). Alternatively, the same determined vector signature (now a reference vector signature) may be saved multiple times in the reference vector signatures 138, each with the identifier or associate with the user.

At a later time when a particular user is using the media device, the user enters their name, user code, or other suitable identifier via their remote control 140, the presented user GUI 146, and/or another GUI (not shown). Then, if an intervening content segment is received that is to be obscured, and that is also associated with the current user, that particular intervening content segment may be obscured.

If a particular user, or a plurality of users, who are using the media device 102 do not identify themselves to the media device 102, an example embodiment may obscure all intervening content segments that have a vector signature that corresponds to any one of the saved reference vector signatures. Alternatively, if no users are identified, the content segment obscuring system 100 may be disabled so that no intervening content segments are obscured. In another embodiment, if no users are identified, the content segment obscuring system 100 may only obscure intervening content segments that are not associated with a particular user.

Figure 2:
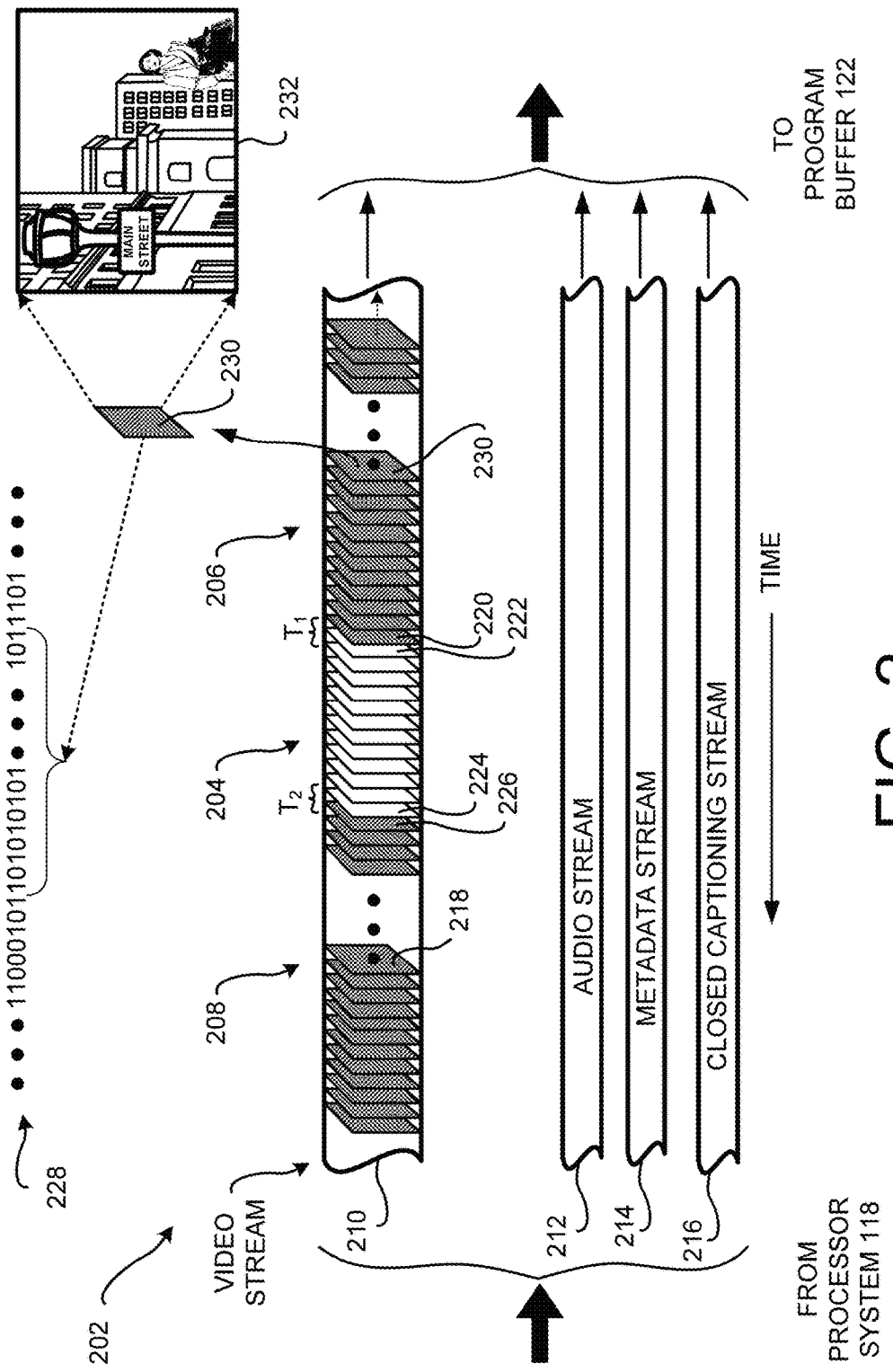
FIG. 2 illustrates a hypothetical simplified example stream of decoded information for a media content event.

FIG. 2 illustrates a hypothetical simplified example stream of decoded information for a media content event 202. The example decoded stream of video and/or audio information output from the processor system 118 (FIG. 1) conceptually includes one intervening content segment 204 disposed between a first content segment 206 of the media content event and a second content segment 208 of the media content event.

In practice, there may be a plurality of intervening content segments, such as a plurality of commercials, advertisements, or the like that are disposed between the content segments 206, 208 of the media content event 202. For illustration purposes, the content segments 206, 208 of the media content event 202 are identified using a grey shading, and the intervening content segment 204 is identified using white shading. The portion of the media content event 202 illustrated in FIG. 2 comprises a portion of a video stream 210, a portion of an audio stream 212, a portion of an optional metadata stream 214, and a portion of an optional closed captioning stream 216.

The video information in the video stream is conceptually illustrated as a series of image frames (such as the example single image frame 218 corresponding to one of a plurality of still images that are sequentially presented on the display 114 to create a video image, such as found in an MPEG stream). Conceptually, the image frame 220 is the last frame of the first content segment 206. The image frame 222 is the first image frame of the intervening content segment 204. The image frame 224 is the last image frame of the intervening content segment 204. The image frame 226 is the first image frame of the second content segment 208.

It is appreciated that the conceptually illustrated decoded stream of video and/or audio information of the media content event 202 of FIG. 2 is, in reality, a stream of binary numbers 228 (i.e., a stream of "1" and "0" bits) that is sampled to provide data for determination of a vector signature. An image frame 230 is conceptually illustrated as a woman looking at a lamp post on "Main Street" in FIG. 2, as illustrated in the image 232. When many of these image frames are serially presented to the viewing user, each image frame having small changes therein, the user perceives a moving video image. As the next image frame is decoded into stream of video and/or audio information, the series of binary numbers for that image frame follows the series of binary numbers for the conceptual image frame 230. In the various embodiments, the content segment obscuring system 100 samples a portion of the series of binary numbers, and then determines a vector signature therefrom. The duration of the sampling period defines a number of bits that are sampled. Accordingly, the number of sampled bits may be correspond to a part of an image frame, a single image frame, or a plurality of image frames. A sufficient number of bits are sampled so that a vector signature is reliably determined.

The duration of the first sampling duration ($T_1$) is sufficiently small such that the vector signature of the initial portion of the intervening content segment 204 can be meaningfully and reliably identified. In an example embodiment, the vector signature for the first image frame 222 of the intervening content segment 204, or a portion of the first image frame 222, is determined from the sampled stream of bits. The determined vector signature associated with this conceptual first image frame 222 of the initial portion of the intervening first content segment 204 will be different from a vector signature determined from the concluding portion of the content segment 206 (such as a vector signature associated with the last image frame 220 of the first content segment 206).

The determined vector signature associated with this first image frame 222 of the initial portion of the intervening content segment 204 is then compared with a plurality of reference vector signatures stored in the reference vector signatures 138 portion of memory 120 (FIG. 1) or that are stored in another suitable memory medium. As noted above, these stored reference vector signatures have been previously determined based on determined vector signatures that have been associated with the initial portion of the user-specified (selected) obscured intervening content segments. If the determined vector signature associated with this first image frame 222 of the initial portion of the intervening content segment 204 corresponds to (matches), or substantially corresponds to, one of the saved reference vector signatures associated with previously defined obscured intervening content segments, then the current intervening content segment 204 will be obscured by embodiments of the content segment obscuring system 100.

Since the sampling process is ongoing, vector signatures for the decoded stream of video and/or audio information for the remainder of the intervening content segment 204 will continue to be determined (after the vector signature for the initial portion of the intervening content segment 204 has been determined). However, since these later determined vector signatures are determined from samples taken after the initial portion of the intervening segment 204, these vector signatures will not correspond to, or substantially correspond to, any of the saved reference vector signatures associated with previously defined obscured intervening content segments (which are known to be associated with the initial portion of their respective obscured intervening content segment).

At some point, the last image frame 224 of the intervening content segment 204 will be output by the processor system 118. The first image frame 226 of the content segment 208 will then be received. Embodiments of the content segment obscuring system 100 will be periodically and continuously sampling the video stream 210. For example, the second sampling duration ($T_2$) is at a time encompassing the conclusion of the intervening content segment 204. Accordingly, the concluding portion of the intervening content segment 204 may be optionally identified by the determined vector signature of that concluding portion of the intervening content segment 204 (which is associated with the last image frame 224). Further, a determined vector signature of the initial portion of the content segment 208 (which is associated with the first image frame 226) will be determined.

Of note, the determined vector signature of the initial portion of the content segment 208 (which is associated with the first image frame 226) will be compared with the plurality of reference vector signatures stored in the reference vector signatures 138 portion of memory 120. Since the determined vector signature associated with the initial portion of the content segment 208 is associated with the media content event of interest, this determined vector signature will not correspond to (match), or substantially correspond to, one of the saved reference vector signatures associated with previously defined obscured intervening content segments. Accordingly, the content segment 208 will not be identified as being one of the predefined obscured intervening content segments, and therefore, will not be obscured by embodiments of the content segment obscuring system 100.

Summarizing, the location and/or orientation in the multi-dimensional vector space for each of the determined vector signature is compared with the location and/or orientation of each of the plurality of reference vector signatures that are stored in the reference vector signatures 138 portion of memory 120. In the event that one of the determined vector signatures corresponds to, or substantially corresponds to, one of the saved reference vector signatures associated with previously defined obscured intervening content segments, then two characteristics about the sampled portion of the intervening content segment are determinable. First, the match indicates that the sampled portion of the intervening content segment is associated with the initial portion of that particular intervening content segment. Second, the match indicates that this particular intervening content segment should be obscured.

In the event that a determined vector signature does not match one of the saved reference vector signatures associated with previously defined obscured intervening content segments, then the content segment obscuring system 100 determines that the vector signature is not associated with an initial portion of the sampled content segment. Accordingly, no further action is taken by the content segment obscuring system 100, and the vector signature of the next portion of the sampled decoded stream of video and/or audio information is sampled and the vector signature is determined therefrom.

In some situations, the sampling of the decoded stream of video and/or audio information will include a small portion of the very end of a concluding content segment and a small initial portion of the subsequent content segment. Accordingly, the determined vector signature cannot be meaningfully associated with either content segment. As the next sample of the stream of information (bits) is taken by the content segment obscuring system 100, this sample has sufficient information therein so that that next sample may be associated with the initial portion of the subsequent content segment. The vector signature for that next sample will be determined, and can be associated with the initial portion of the current content segment. This vector signature will be compared with stored reference vector signatures of associated with previously defined obscured intervening content segments.

Alternatively, or additionally, some embodiments of the content segment obscuring system 100 may sample the decoded information stream for the audio stream 212, the metadata stream 214, and/or the closed captioning stream 216 to define vector signatures therefrom. Such alternative sampling, or additional sampling, will improve the reliability of the determination that an initial portion of an obscured intervening content segment has been identified.

Figure 3:
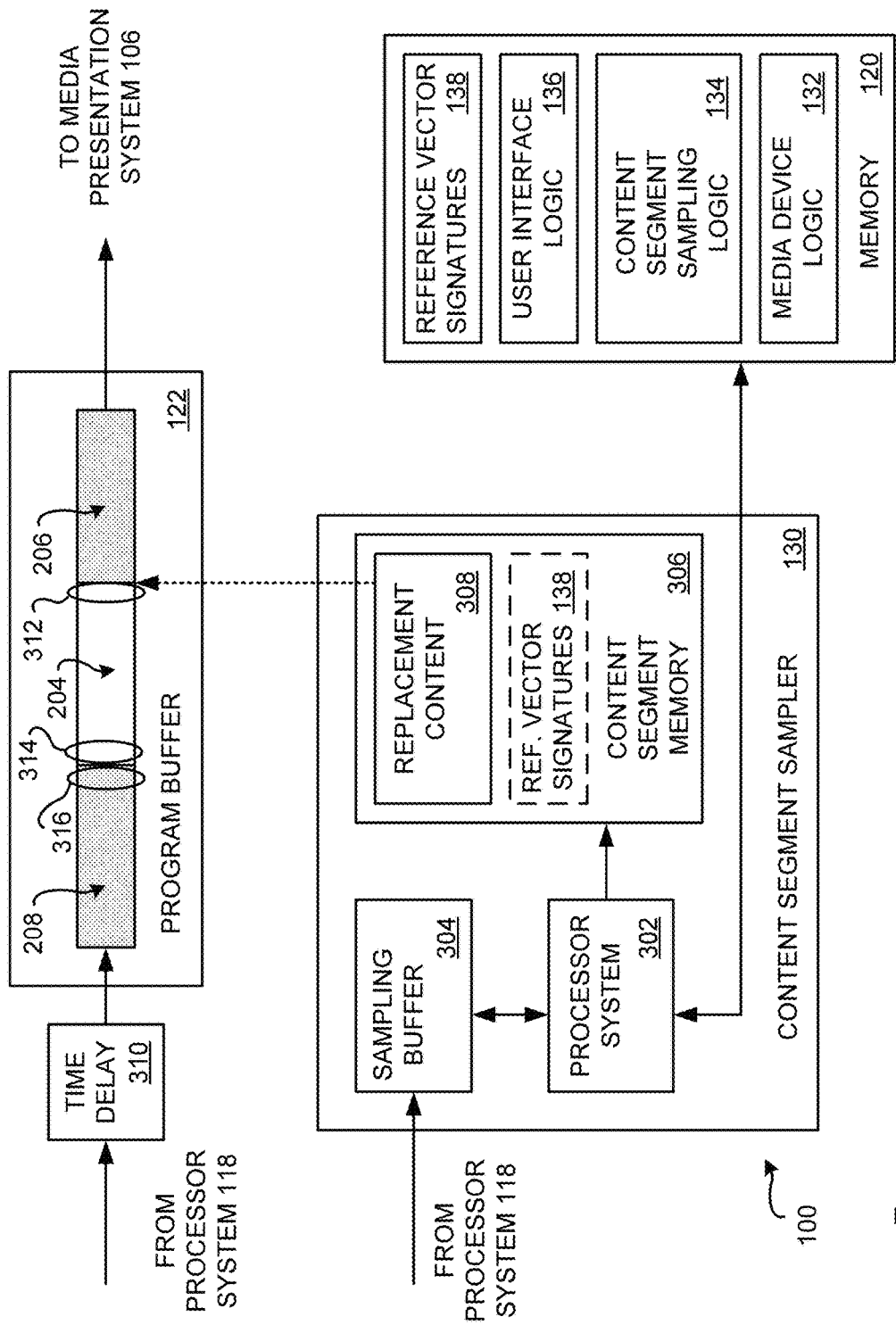
FIG. 3 is a block diagram of an example embodiment of the content segment sampler.

FIG. 3 is a block diagram of an example embodiment of the content segment sampler 130. The example content segment sampler 130 comprises a processor system 302, a sampling buffer 304, and a content segment memory 306. The content segment memory 306 stores the replacement content 308. Alternatively, the replacement content may be stored along with the reference vector signatures that have been stored in the associated reference vector signatures 138. In alternative embodiments, the content segment sampler 130 may include other elements or components, and/or one or more of the illustrated components may reside elsewhere in the media device 102. Further, components of the content segment sampler 130 may be optionally integrated with other components of the media device 102.

For example, but not limited to, the replacement content may be stored in a portion of the memory 120 (FIG. 1). Alternatively, or additionally, the replacement content may be stored in a memory medium of a remote device that is external to the media device 102. For example, but not limited to, the reference vector signatures may be stored in the memory medium of a remote device. The media device 102 may access the memory medium of the remote device via a communication system, such as a telephony system, the Internet, a Wi-Fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. In an alternative embodiments, the content segment sampling logic 134 and/or the user interface logic 136 may reside in the content segment memory 306.

Alternatively, or additionally, the functionality of the processor system 302 may be performed by the processor system 118 (FIG. 1) or by another multi-purpose processor system that is also performing other functions. It is understood that any suitable processor system 302 may be employed in various embodiments of a content segment obscuring system 100. Processing system 302 may be a specially designed and/or fabricated processing system, or a commercially available processor system.

Alternatively or additionally, the sample buffer 304 may be included as part of the program buffer 122 or another memory medium. In an alternative embodiment, the sampling buffer 304 may be a portion of the memory 120. Contents of the sampling buffer 304 may be saved into, read from, and/or moved out from the sampling buffer 304 using any suitable data buffering process and/or system.

In some embodiments, there is an inherent delay duration between the time that a portion of the decoded stream of decoded video and/or audio information (the stream of bits) arrives at the program buffer 122, passes through the program buffer 122, and then finally exits the program buffer 122. This delay time associated with the passing of the decoded video and/or audio information through the program buffer 122 may be sufficiently long enough so that the content segment sampler 130 has sufficient time to be able to sample portions of the decoded stream of video and/or audio information, determine vector signatures for each sample, compare the determined vector signatures with the stored reference vector signatures residing the in the reference vector signatures 138, identify a currently sampled intervening content segment as an obscured intervening content segment, and then take actions to obscure the identified intervening content segment 204 before an initial portion 312 of the intervening content segment 204 exits the program buffer 122 (or at least exits the presentation device interface 126).

However, the inherent time delay for the decoded video and/or audio information (stream of bits) passing through the program buffer 122 may not be sufficient for the content segment sampler 130 to complete the above-described process. Accordingly, a time delay 310 may be included in some embodiments. The time delay 310 (interchangeably referred to as a time delay circuit 310) may be implemented as firmware, hardware, or a combination of firmware and hardware.

In the illustrated example embodiment, the time delay 310 delays delivery of the decoded stream of video and/or audio information to the program buffer 122. The time delay 310 thereby causes a delay of the communication of the stored contents (i.e., the decoded stream of video and/or audio information) from the program buffer 122 by some predefined duration. Accordingly, embodiments of the content segment sampler 130 have an additional amount of time to complete the sampling and processing of the sampled portions of the content segments to ascertain if a determined vector signature of the sampled portions of the decoded stream of video and/or audio information correspond to one of the plurality of stored reference vector signatures.

In alternative embodiments, the time delay 310 is implemented at another suitable location in the media device 102. For example, the time delay 310 may be located between the program buffer 122 and the presentation device interface 126, or may be located after the output of the presentation device interface 126. If obscuring is performed, embodiments of the content segment obscuring system 100 will then have time to intercept the identified intervening content segment (the new identified obscured intervening content segment), and obscure presentation using suitable replacement content.

As noted herein, if the content segment sampler 130 determines that a vector signature of the sampled decoded stream of video and/or audio information corresponds to one of the stored plurality of reference vector signatures, that particular corresponding content segment is then obscured such that the obscured intervening content segment is not communicated to the media presentation system 106 for presentation to the user. For example, the sampling buffer 304 is illustrated in FIG. 3 as buffering the intervening content segment 204 disposed between a portion of the first content segment 206 and a portion of the second content segment 208. In response to the content segment sampler 130 determining that the vector signature of the initial portion of the intervening content segment 204 corresponds to, or substantially corresponds to, one of the saved reference vector signatures, the example intervening content segment 204 in the buffer will be obscured.

In the simplified conceptual example of FIG. 3, the leading edge of the intervening content segment 204 is conceptually shown as the initial portion 312. In some embodiments, during the sampling process, the location of each sampled portion of the decoded stream of video and/or audio information is monitored, tracked, or is otherwise saved and is associated with its respective sample portion. Further, the location of the portions of the decoded stream of video and/or audio information currently stored in the program buffer 122 is also determinable. When the vector signature of the intervening content segment 204 identifies the intervening content segment 204 as an obscured intervening content segment, the location of this sample is known to be associated with the initial portion of that particular intervening content segment 204 (since only the reference vector signatures for the initial portions of previously identified intervening content segments have been stored in the reference vector signatures 138). Once the location of the sampled portion that is known to be the initial portion of the intervening content segment 204 is determined, then the corresponding location of the initial portion of the intervening content segment 204 stored in the program buffer 122 can be determined. Accordingly, the content segment obscuring system 100 can determine where the start of the intervening content segment 204 is located in the program buffer 122 so that the obscuring may be correctly timed with the output of data from the program buffer 122 (and/or the replacement of the intervening content segment data that is to be obscured with replacement content data).

In alternative embodiments, the content segment sampler 130 is implemented as firmware, hardware, or a combination of firmware and hardware, so that the processing of sampling, the comparing of determined vector signatures with reference vector signatures, and the initiation of the obscuring process is synchronized with the data passing through the program buffer 122. That is, components of the content segment sampler 130, memory 120, the program buffer 122, and/or the time delay 310 are configured so that the duration associated with data buffering through the program buffer 122 corresponds to the duration of the above-described process performed by the content segment sampler 130.

Based on the determined corresponding location of the initial portion of the intervening content segment 204 stored in the program buffer 122, the process of obscuring can begin. The process of obscuring the intervening content segment 204 ends as the ending portion 314 of the intervening content segment 204 otherwise reaches the output of the program buffer 122. The end (concluding portion 314) of the intervening content segment 204 may be determined in a variety of ways. Any suitable process or system identifying the conclusion of an intervening content segment 204 stored in the program buffer 122 may be used by the various embodiments.

For example, metadata information associated with the intervening content segment 204 that is initially received in the media content stream 104 (FIG. 1) may indicate the duration of the intervening content segment 204. Alternatively, metadata identifying the start (initial portion 316) of the second content segment 208 may be used to identify the concluding portion 314 of the intervening content segment 204 that is to be obscured.

Information defining the duration of the intervening content segment 204 may be stored with and associated with the reference vector signature saved in the reference vector signatures 138. When a user first decides that they do not wish to see a particular intervening content segment at a later date, the user provides a specification to the media device 102 to indicate that the currently presented intervening content segment is a segment that is to be obscured if that particular intervening content segment is later received in the media content stream 104. The content segment obscuring system 100 then determines the vector signature of the initial portion of the identified intervening content segment. This determined vector signature is saved as a reference vector signature into the reference vector signatures 138. At that juncture, information associated with the duration of the obscured intervening content segment may also be saved. For example, the duration of the obscured intervening content segment may be saved into the reference vector signatures 138, or in another memory medium, and may be associated with that particular saved reference vector signature. Accordingly, at a later time when that particular obscured intervening content segment is provided in the media content stream 104 (as indicated by its determined vector signature which corresponds to, or substantially corresponds to, the stored reference vector signature), the associated duration of that identified obscured intervening content segment may be retrieved and used to identify or determine when the obscuring process is to conclude.

In some situations, standard durations may be known for particular ones of the intervening content segments that are received in the media content stream. For example, a commercial or advertisement may have a known standard duration of 15 seconds, 30 seconds, or the like. Accordingly, the standard associated duration of that identified obscured intervening content segment may be used to identify or determine when the obscuring process is to conclude.

In some embodiments, sampling of the decoded stream of video and/or audio information continues on an ongoing basis, even after the initial portion of an intervening content segment that is to be obscured has been identified. Determined vector signatures for later samples that are taken of that particular intervening content segment may have attributes that are similar to the vector signature of the initial portion of the intervening content segment (which was used to identify that particular intervening content segment for obscuring). For example, the concluding portion 314 of the intervening second content segment 208 that is to be obscured may be identified when the vector signature of the initial portion 316 of the second content segment 208 is determined since the attributes of that determined vector signature will be substantially different from the attributes of vector signatures determined from the samples of the concluding portion 314 of the intervening content segment 204. That is, when attributes of determined vector signatures for adjacent samples substantially change, this change of vector signature attributes may be used to identify the conclusion of the intervening content segment 204.

Obscuring of an intervening content segment that has been identified for obscuring (i.e., identified as an obscured intervening content segment) may be performed by the various embodiments in a variety of manners. Any suitable obscuring process and/or system may be used. Further, a plurality of different obscuring processes and/or systems may be used.

In some embodiments, the particular obscuring that is used to obscure an intervening content segment may be defined based on a user selection. For example, the user may make a selection for a preferred type of obscuring via their remote control 140 and/or the presented user GUI 146 (FIG. 1).

An example of obscuring may be to replace the video content of the obscured intervening content segment with visible replacement content. Non-limiting examples of visible replacement content may include, but is not limited to, a predefined obscuring image, such as a colored blank or patterned screen image or the like. Any suitable obscuring image may be used as the replacement content, such as a still image of an object that may be pleasing to the user (such as a family photograph or other photograph selected by the user, a stock photograph of natural scenery or of a city or the like, a picture of art or other graphic design). Alternatively, or additionally, text that may be pleasing to the user may be presented (such as a famous quote, a poem, or the like) as replacement content. Alternatively, the video portion of the obscured intervening content segment may be obscured using any suitable replacement video segment (such as a cartoon, an interactive video, a personal video clip, or the like). In the various embodiments, the user may make a selection for a preferred type of visual obscuring via their remote control 140 and/or the presented user GUI 146 (FIG. 1).

Alternatively, or additionally, the audio portion of the obscured intervening content segment may be replaced with replacement content. An example of audible replacement content includes silence (no audio output from the media presentation system 106). Alternatively, the audio portion of the obscured intervening content segment may be replaced with a pleasing sound, such as music, dialogue, or natural sounds (e.g., ocean and/or wind sounds).

Alternatively, or additionally, the obscured intervening content segment may be obscured by presentation of replacement content. For example, but not limited to, another intervening content segment, such as another advertisement, commercial, or the like may be used to obscure the obscured intervening content segment. In some embodiments, the user may specify which particular intervening content segment will be presented while the obscured intervening content segment is being obscured. Alternatively, the replacement intervening content segment may be specified by another party, such as the content provider or the like.

The various replacement content used to obscure the obscured intervening content segment may be stored in memory, such as in the replacement content 308. Embodiments of the content segment obscuring system 100 then retrieve the replacement content (video and/or audio content) from the replacement content 308. The retrieved replacement content is then streamed out to the media presentation system 106 (instead of the obscured intervening content segment) for presentation to the user during the duration of the obscured intervening content segment. Alternatively, the replacement content may be used to replace the data stored in the program buffer 122 that is associated with the intervening content segment that is being obscured. Presentation of the replacement content concludes at the end of the duration of the obscured intervening content segment, and presentation of the remaining portion of the decoded stream of video and/or audio information resumes.

In the example embodiment of FIG. 3, the replacement content 308 is illustrated as a portion of the content segment memory 306 of the content segment sampler 130. In other embodiments, the replacement content may be stored in alternative memory medium, such as, but not limited to the memory 120 of the media device 102. Alternatively, or additionally, the replacement content may be stored in a memory medium that is external to the media device 102. For example, but not limited to, the replacement content may be stored in a memory medium of a remote device that the media device 102 accesses via a communication system, such as a telephony system, the Internet, a Wi-Fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media.

Alternatively, or additionally, the media device may present alternative media content during the duration of the obscured intervening content segment. For example, one of the tuners 116a (FIG. 1) may be operated to temporarily change the channel to different content being received in the media content stream 104. For example, but not limited to, the user may be watching a sporting event on Channel "A". During the duration of the obscuring of the obscured intervening content segment, an alternative sporting event of interest may be presented on Channel "B" by re-tuning the tuner 116a, or another tuner, to that replacement content channel (Channel "B"). Upon conclusion of the obscured intervening content segment, the presentation of the initial sporting event on Channel "A" may resume. In the various embodiments, the user may make a selection for a preferred type of visual obscuring via their remote control 140 and/or the presented user GUI 146 (FIG. 1). For example, the user may have predefined the channel or other suitable identifier of the alternative sporting event of interest.

In the various embodiments, an intervening content segment is identified for obscuring based on the comparison of a determined vector signature (the location and/or orientation of the vector signature in a multi-dimensional vector space) for the initial portion of the intervening content segment with at least one of a plurality of saved vector signatures associated with previously selected intervening content segments that the user does not want to have presented on the media presentation system 106. Herein below follows a detailed description of how vector signatures are determined by various embodiments of the content segment obscuring system 100.

FIG. 4 is a conceptual diagram 400 of a reference vector 402 and a vector 404 corresponding to a sample vector signature in a three-dimensional vector space. Here, the vector 404 defined by the vector signature corresponds to, or substantially corresponds to, the reference vector 402 since the vector 404 is located and/or orientated in the exemplary three-dimensional vector space within a cone 406, wherein the cone is defined by a half angle about some predefined fixed angle 408.

Below is a mathematical algorithm for a neural net that solves the so-called "generalized" object recognition problem. It is assumed that there are several sensors available, each of which produces numerical data. The totality of this information is assumed to be in the form of ordered k-tuples of real numbers; that is, it is realized as vectors in a k-dimensional real vector space.

$$\vec{x}^T = (x_1, x_2, \ldots, x_k). \quad \text{(Eq. 1)}$$

The vectors above are defined as the vector signatures ($\vec{x}^T$) that are determined by embodiments of the content segment obscuring system 100.

The problem solved by embodiments of the content segment obscuring system 100 is how to distinguish between any given n samples of such data (the samples of the decoded stream of video and/or audio information) in the following sense: Let certain of these samples be given as fixed; they will be called the "true" samples. When presented with another sample in k-dimensions, the objective is to determine which of the true samples does it represent?" (It is appreciated by one skilled in the art that "None of the above" is a permissible response.)

The present process and systems for the content segment obscuring system 100 solve the above-identified problem by means of a two-step approach in which an algebraic prolongation precedes the linear associator model. The potential non-linearity will be represented abstractly by a set of true samples whose number is significantly greater than the dimension of the ambient vector space; that is, $\gg k$. An example is suggested by the recent popular title, "Fifty Shades of Grey." In this case, the underlying vector space has k=1 dimension, and there are n=50 samples in it First, the algebraic prolongation: The true samples will be carried into a higher dimensional space by a map whose entries are algebraic combinations in the entries of the original samples. The target vector space will have at least as many dimensions as there are true samples. To be more specific, let the samples lie in the vector space $\mathbb{R}^k$, and denote the target space by $\mathbb{R}^m$, where m≥n. Then the prolongation may be denoted by the mapping.

$$P: \mathbb{R}^k \to \mathbb{R}^m. \quad \text{(Eq. 2)}$$

Each component of this mapping, say $P_j(\vec{x})$, will be a polynomial in the variables $\{x_h\}_{h=1}^k$. The fundamental condition on this map is that the image set of true samples should be n linearly independent vectors in the target space. One skilled in the art appreciates that when n>k, the true samples cannot be linearly independent, and no linear map can force the images to be so. The polynomial condition appears to be the simplest condition that will permit such a change.

Suppose that the original set of true samples is denoted as $\{\vec{\tau}_\alpha\}_{\alpha=1}^n$, and the prolonged vectors are labelled as $\{P(\vec{\tau}_\alpha)\}_{\alpha=1}^n$. When the target dimension is equal to the number of samples (m=n), the matrix of the prolonged vectors will be invertible and it provides a mapping from the prolonged vectors into some orthonormal frame $\{\vec{e}_i\}_{i=1}^n$ for the target space. The latter will be termed the "ideal" samples.

Second, the basic linear associator model is used. The linear associator model works best when provided with such an orthonormal set of vectors. To complete a description of determining vector signatures, the details of the implementation that will be employed are next considered.

By orthonormal frame one means a set of mutually perpendicular vectors of unit length. In three dimensions, the lines where two walls and a ceiling meet is a good example. The arrangement is harder to visualize in higher dimensions, so the example is considered in three dimensions. About each of the vectors, $\vec{e}_1$, $\vec{e}_2$, and $\vec{e}_3$, a cone of a half angle is defined as being less than 45°; any larger than that, and the cones will intersect, since there are 90° between each axis.

In practice, a vector signature determined from a sample substantially corresponds to a predefined reference signature vector if the determined vector signature for a sample falls within a half angle of about 30° of the reference vector signature. That is, if an initial portion of a currently received intervening content segment has a vector signature that is located in the vector space that substantially corresponds to the location of a stored reference vector signature determined from the previously received intervening content segment, then that particular intervening content segment is to be obscured in later received in the media content stream 104. Here, substantially corresponding to is defined as the vector of a vector signature that is located in a vector space that is within a cone defined by a half angle of about some predefined fixed angle that is oriented about a location of the vector of the reference vector signature. In an example embodiment, the half angle is defined as 30°. Any suitable angle may be defined about the reference vector signature.

The normal operation of the neural net then amounts to the following: When a new sample comes into the system, the determined vector signature of the new sample is thrown into the ideal space (by the algebraic prolongation). If the vector of the determined vector signature falls into one of the cones defined about a location and/or orientation of vector of a reference vector of the reference vector signature, the determined vector signature of that sample is determined to be a (possibly) noisy version of the cone's axis, and thereby provides a solution to the original object identification problem.

It is entirely possible that the incoming the determined vector signature of the sample might fall outside of these cones. For this eventuality, a slightly different approach may be taken. A large sphere is erected about the common origin of the orthonormal frame, and a topography is constructed over it. This landscape will have valleys centered around the tip of each member of the frame, and mountains surrounding the valleys. Newton's method of descent can then be employed to move the incoming sample toward the nearest member of the orthogonal frame. When that motion gets within the confines of the surrounding cone, the identification of the determined vector signature can be made. The latter process takes a little longer than the previous method, but it will still identify the correct answer.

The final aspect of the process of analyzing vector signatures determined from samples of the decoded stream of video and/or audio information is the handling of an incoming sample that is not like any of the idealized samples. In the "ideal" space, the negative of the so-called diagonal direction $(1, 1, \ldots, 1)$ is completely different from the members of the frame, and its cone could be made much larger. This is where all the other samples will be collected under the category of "none of the above."

Polynomial extensions may be used to process samples. In discussing the mapping (see Eq. 2), three traits of any set of samples are considered:

k=The dimension of the ambient space that contains the samples, r=dimension of the smallest vector sub-space that contains all samples, and n=the number of such samples.

One skilled in the art appreciates that r≤k, and the process will generally be concerned about the case k<<n. Select a basis for the ambient space; then, the samples can be written as k-tuples of numbers; that is, as a collection of row vectors that are arranged into a matrix of k columns. The number of rows will be the same as the number of samples, n. This defines the sample matrix S; it has size n×k.

Some ground rules about samples should be considered. An assumption is made that no two sample vectors are equal. In some embodiments, handling multiple repeats can be done by a system of weights. As another assumption, no sample vector should be zero (as it therefore is not a valid sample).

For convenience, the image of the map (defined be equation 2) will be represented by another matrix M. On its right-hand side, there is a copy of the sample matrix S. The matrix M has n rows, and the number of columns, m, must be larger than k, and large enough to satisfy m≥n. Using the block notation for matrices, the left-hand side of the extension is defined to be $\tilde{M}$. Using subscripts to indicate the dimensions of the sub-blocks, the full extension matrix may be written as.

$$M_{n \times m} = [\tilde{M}_{n \times (m-k)} | S_{n \times k}] \quad \text{(Eq. 3)}$$

The main point about the left-hand side block $\tilde{M}$ is that its entries along a given row are monomials in the variables of the same row in S. In the introduction, the samples were defined to be the set of vectors $\{\vec{\tau}_\alpha\}_{\alpha=1}^n$. In the present case, the $\alpha^{th}$ sample vector is the $\alpha^{th}$ row of the matrix S; thus, an entry of $\tilde{M}$ in the row=$\alpha$, column $1 \leq \beta \leq m-k$, is given by the formula:

$$[\tilde{M}]_{\alpha,\beta} = \Pi_{j=1}^k (\vec{\tau}_\alpha)^{p_j}. \quad \text{(Eq. 4)}$$

On the right-hand side, the curly brackets around the vector $\vec{\tau}_\alpha$ provide a method of selecting its $j^{th}$ component. The $\alpha^{th}$ row of the full matrix M is precisely the map P of (see Eq. 2) evaluated on the entries of the sample vector $\vec{\tau}_\alpha$. It is emphasized that all the monomials (see Eq. 4) in column $\beta$ have the same form; but they use different variables as the row index $\alpha$ changes. This will become important when the linear associator is employed to identify other incoming samples.

To summarize, the sample matrix S has size n×k with n≥k. Hence, its maximal rank $r_S$=k. The extension matrix M has size n×m for m≥n. Thus, its maximal rank $r_M$=n. These ideas are employed in the major result of the section:

Theorem: For every sample pattern of size $n \times k$, there is a polynomial extension map $P: \mathbb{R}^k \to \mathbb{R}^n$ such that for almost every choice of $n$ samples $\{\vec{\tau}_j\}_{j=1}^n$ that have maximal rank, the monomial extension matrix $M \equiv \oplus_{j=1}^n \vec{e}_j \otimes P(\vec{\tau}_j)^T$ also has maximal rank. (Eq. 5)

The proof of the above theorem appears in. At this point, some explanatory comments are useful. The theorem merely discusses monomial extension. However, it should be clear that any polynomial extension can be obtained from M via post-multiplication by some m×m matrix Q of constants. As long as the latter matrix is invertible, it is clear that the resultant "polynomial" extension will have maximal rank. Therefore, it is enough to establish theorem (Eq. 5) in its present form.

The phrase 'for almost every choice' needs explanation. The rank condition on the matrix M involves determinants in the variables $M_{p,q}$ for $1 \leq p \leq n$ and $1 \leq q \leq m$. By assumption, all of these variables are monomials in the sample vectors' entries. Hence, the rank condition will fail along a sub-variety in a space of dimension n·k. As long as this sub-variety has a positive co-dimension, it will have the measure zero in the entire space of samples. The maximal rank hypothesis is meant to insure that this co-dimension is positive.

The theorem above is meant to be applied in computer-type environments. In the rare event that the maximal rank conclusion of the theorem fails, it will usually be possible to perturb the true samples slightly to avoid the offending sub-variety. This is reasonable since computer data always has some level of intrinsic error. An alternative solution employed by alternative embodiments uses a linear multiple (of nearly unit size) for all the samples. This new set may violate the algebraic condition on which the theorem fails. Then, the extension will again have maximal rank as desired.

The utility of the theorem is that it provides a suggestion about how to proceed in almost every case. Yet, one should always compute the relevant determinants to insure that the extension is proper. Furthermore, the ratio of the determinant to the product of the length of all its rows will indicate the stability of its numerical perturbations as well as the stability of the inversion process that must occur during the passage to the linear associator.

A variety of examples is useful in explaining why the theorem might be possible, how maximal rank enters the problem, and the subtlety of its conclusion. The process is examined by beginning with a classical result due to Vandermonde.

EXAMPLE (1)

Consider four real sample numbers {a, b, c, d}. The associated sample matrix S is the transpose of this set of numbers in the same order. To follow the historical precedent set by Vandermonde, the extension matrix is written as:

$$M = \begin{bmatrix} 1 & a & a^2 & a^3 \\ 1 & b & b^2 & b^3 \\ 1 & c & c^2 & c^3 \\ 1 & d & d^2 & d^3 \end{bmatrix}. \quad \text{(Eq. 6)}$$

Notice that sample matrix S is really the second column of this matrix. In fact, M is just a permutation of the columns of our extension matrix. (Such alterations will be done as the situation demands.) The determinant of M is a sum of terms, each of which is a product of four numbers, one chosen from each column so that no two numbers lie in the same row. It follows that each product has total order 0+1+2+3=6. This equals the number of choices of two numbers out of four. In fact, the determinant is the product of differences of six pairs, shown below:

$$det(M) = (a-b) \cdot (a-c) \cdot (a-d) \cdot (b-c) \cdot (b-d) \cdot (c-d). \quad \text{(Eq. 7)}$$

The result may be interpreted to say that when the four samples are distinct, this extension matrix has maximal rank. In accordance with the theorem the sample matrix has maximal rank when at least one of the numbers is non-zero. One skilled in the art appreciates that were all the numbers zero, the distinction between the samples would be a pointless task.

Vandermonde's result will work for any set of n real numbers; and it yields an extension matrix involving n columns with monomials up to order n−1, and its determinant is a product of the differences between any two of the samples. The phenomenon is an example of our theorem for any n samples in one dimension.

EXAMPLE (2)

The lowest order monomial in any extension is a constant. The extension for three samples in two dimensions is:

$$M = \begin{bmatrix} 1 & x & y \\ 1 & u & v \\ 1 & r & s \end{bmatrix}. \quad \text{(Eq. 8)}$$

The sample matrix S constitutes the right-hand two columns of six variables; and our hypothesis is that this 3×2 matrix has rank two. This means that at least one of the three 2×2 sub-blocks of S has non-zero determinant.

First, examine the failure of the rank hypothesis. It means that all the 2×2 sub-blocks have zero determinants. By a row expansion of the determinant of M:

$$\det(M) = \det\begin{bmatrix} x & y \\ u & v \end{bmatrix} - \det\begin{bmatrix} x & y \\ r & s \end{bmatrix} + \det\begin{bmatrix} u & v \\ r & s \end{bmatrix} = 0. \quad \text{(Eq. 9)}$$

In other words, the rank conclusion of the theorem will always fail under these circumstances, and it is suggests that the rank hypothesis is a necessary consequence of the rank conclusion.

Second, a case is considered in which the rank-two hypothesis is valid. Were the matrix M to fail to have maximum rank three, then the three row vectors of the sample matrix S would be collinear in the sense that there is a line, not necessarily passing through the origin, upon which the tips of all three vectors must lie. This condition defines a sub-variety of the full six dimensions that has positive co-dimension. In fact, it can be shown to have five degrees of freedom: One point on the line, a direction for the line, and two spacings between the three points.

The above two cases are very similar. The rank-one condition means that the three vectors in the rows of S lie on a line that passes through the origin. This is slightly more restrictive than lying on a line that need not pass through the origin. This minor difference is due to the small size of the chosen extension; but the example does reveal two important facts: The first situation shows that low rank can always result in a bad extension; and the second shows that the maximal rank hypothesis gives a good extension almost always.

EXAMPLE (3)

Here another illustrative example is provided that employs a different extension for the sample matrix of the previous example.

$$M_c = \begin{bmatrix} x^2 - y^2 & 2xy & x & y \\ u^2 - v^2 & 2uv & u & v \\ r^2 - s^2 & 2rs & r & s \end{bmatrix}. \quad \text{(Eq. 10)}$$

The two new columns are the real and imaginary parts of the squares of complex numbers that are built out of the six sample numbers.

$$\omega \equiv x+iy, \; \xi \equiv u+iv, \text{ and} \quad \text{(Eq. 11)}$$

$$\lambda \equiv r+is. \quad \text{(Eq. 12)}$$

By employing complex methods, one may prove that this extension matrix $M_c$ does not have maximal rank if, and only if, the three complex variables satisfy the equations:

there is a real number $r \geq 1$ such that $\omega \cdot \xi = r \cdot \lambda$, and (Eq. 13)

$$\omega \cdot \xi \cdot \bar{\lambda} = (\omega + \xi - \lambda)^2. \quad \text{(Eq. 14)}$$

Each formula imposes two real conditions on our six variables. Hence, the rank conclusion of our theorem fails on a sub-variety of co-dimension four. This certainly has measure zero in the ambient space of six dimensions.

EXAMPLE (4)

A more specific case will bring home the point more forcibly. By random choice, $\omega=2+i$, $\xi=1+3i$, and $\lambda=-1+i$ are selected. They do not satisfy the second condition. Accordingly, the current extension matrix should have maximal rank. It is found to be $$M_c = \begin{bmatrix} 3 & 4; & 2 & 1 \\ -8 & 6; & 1 & 3 \\ 0 & -2; & -1 & 1 \end{bmatrix}. \quad \text{(Eq. 15)}$$

One may show that the sub-extension formed by columns one, three and four has determinant=−12, and the sub-extension made out of columns two, three and four has determinant=36. Either choice will suffice for use in the rest of the neural net algorithm.

A major obstacle to the application of the theorem is insuring that the sample matrix has maximal rank. Embodiments resolve this issue by insuring that the dimension of the ambient space is the same as the rank. The natural vector space to which one should reduce the data is the image of the matrix $S^T$, as defined next, along with a closely related space, as shown below:

$im(S^T)$=the vector space spanned by the rows of the matrix $S^T$, and (Eq. 16)

$ker(S)$=the vector space of all vectors in $\mathbb{R}^k$ that are mapped to zero by matrix. (Eq. 17)

The two spaces are mutually orthogonal to one another; thus, ker(S) can be employed to delineate $im(S^T)$. The rank decomposition of may be used to generate bases for both of these spaces. The result of that discussion is expressed in terms of the transpose:

$$S^T = \begin{bmatrix} I \\ N^T \end{bmatrix} \cdot R^T \cdot [I \; P^T]. \quad \text{(Eq. 18)}$$

The vector space $im(S^T)$ has dimension r; and it is generated by vectors that have the following block-form:

$$\vec{\omega} \equiv \begin{bmatrix} I_{r \times r} \\ (N^T)_{l \times r} \end{bmatrix} \cdot \vec{u}. \quad \text{(Eq. 19)}$$

Proof: By definition of rank, the vector space $im(S^T)$ has dimension r. The block form spans that number of dimensions because of the upper term $I_{r \times r}$. Now, any vector in the image of the matrix $S^T$ can be expressed in the above form when the coefficient vector $\vec{u}$ is written as shown below:

$$\vec{u} = R^T \cdot [I \; P^T] \cdot \begin{bmatrix} \vec{x} \\ \vec{y} \end{bmatrix}. \quad \text{(Eq. 20)}$$

The vector space ker(S) has dimension l=k−r; and it is generated by vectors like:

$$\vec{\xi} = \begin{bmatrix} -N_{r \times l} \\ I_{l \times l} \end{bmatrix} \cdot \vec{x}. \quad \text{(Eq. 21)}$$

Proof: The vector space ker(S) is orthogonal to the previous vector space; hence, it must have the complementary dimension l=k−r. The block form exhibited above, spans this many dimensions because of the lower term $I_{l \times l}$. To demonstrate orthogonality, some vector $\vec{\omega}$ in im($S^T$) is chosen, and any vector $\vec{\xi}$ in ker(S). By employing the block format, the following computation results:

$$\langle \vec{\omega}, \vec{\xi} \rangle = \vec{\omega}^T \cdot \vec{\xi} = \vec{u}^T \cdot [I \ N] \cdot \begin{bmatrix} -N \\ I \end{bmatrix} \cdot \vec{x} = \vec{u}^T \cdot \{-N + N\} \cdot \vec{x} = 0. \quad \text{(Eq. 22)}$$

In order to restrict our attention to only r-dimensional samples, a map is used from the sample space $\mathbb{R}^k$ onto im($S^T$). It is constructed from sub-matrix $N_{r \times l}$ of the original matrix S. The process also requires the matrix $\Xi \equiv I + N \cdot N^T$. It has size r×r, and is symmetric. It is also strictly non-negative; and hence invertible. That inverse appears in the next statement.

The mapping $\Pi: \mathbb{R}^k \to \mathbb{R}^k$ is defined in block format by:

$$\Pi \equiv \begin{bmatrix} I \\ N^T \end{bmatrix} \cdot \Xi^{-1} \cdot [I \ N]. \quad \text{(Eq. 23)}$$

The mapping $\Pi$ is an orthogonal projection in the sense that it is symmetric, and its square is equal to itself. Moreover, its image is im($S^T$) and its kernel is ker(S).

Proof: The symmetry follows from the block format. The left-hand factor shows the image of $\Pi$ is the same as the image of $S^T$, and the right-hand factor shows that its kernel is ker(S). The central factor is crucial in demonstrating that the squaring result is true.

$$\Pi^2 = \begin{bmatrix} I \\ N^T \end{bmatrix} \cdot \Xi^{-1} \cdot [I \ N] \cdot \begin{bmatrix} I \\ N^T \end{bmatrix} \cdot \Xi^{-1} \cdot [I \ N]. \quad \text{(Eq. 24)}$$

Here, the middle two factors give $$[I \ N] \cdot \begin{bmatrix} I \\ N^T \end{bmatrix} = \Xi;$$

and the rest of the expression then reduces to the desired statement $\Pi^2 = \Pi$.

Now, every sample is a column of $S^T$; and the square relationship means that these rows are not changed by an application of the map $\Pi$. More directly, one shows that $S^T = \Pi \cdot S^T$. This insures that when any sample $\vec{\tau}$ is submitted to the map $\Pi$, the original samples will not be changed. The objective of dimension reduction is essentially accomplished by an application of the map $\Pi$.

One final note about appropriate coordinates for the reduced space: The initial factor $$\begin{bmatrix} I \\ N^T \end{bmatrix}$$

of the decomposition for $S^T$ provides a basis for its image; and the coefficients are given by the vector $\vec{u}$ in formula (2.11). The invertible matrix R may be viewed as a change of coordinates. Hence, the final term $[I \ P^T]$ gives the components of the original samples in the new context. It is a matter of taste whether or not one wishes to include the matrix R in the description of the new arrangement. Usually, the decision should be based upon consideration of numerical accuracy.

Summarizing, the objective is to solve the abstract object identification problem (AOIP). Presuppose that some phenomenon has been reduced to a standard set of cases. When presented with a new test sample of that phenomenon, find the standard case to which it is closest.

Hypothesis: All the important identifying features of the phenomenon have been reduced to a fixed set of numbers. In other words, each sample can be viewed as a k-tuple of numbers. They exist in a k-dimensional vector space, $V_1$, the "sample world."

Setup: The standard cases generate a mapping from the sample world to the "ideal world."

(I): Let the cases in the standard set be denoted by $\{\vec{\tau}_j\}_{j=1}^n$. This is equivalent to a sample matrix of size n×k:

$$S = \bigoplus_{j=1}^{n} (\vec{e}_j \otimes \vec{\tau}_j^T) = \begin{bmatrix} \vec{\tau}_1^T \\ \vec{\tau}_2^T \\ \vdots \\ \vec{\tau}_n^T \end{bmatrix}. \quad \text{(Eq. 25)}$$

(II): Compute the rank r of the sample matrix. If r=k pass to step (IV) using $\Pi = I_{k \times k}$.

(III): When r<k, the dimension of the samples is reduced by the natural mapping.

$$\Pi: V_1 \to im(S^T) \equiv V_2. \quad \text{(Eq. 26)}$$

The target space has the smaller dimension r, and it is known as the "reduced sample world."

(IV): Using the major result of this work, a polynomial map P: im($S^T$) → $\mathbb{R}^n \equiv V_3$ is selected such that the associated extension matrix $M \equiv \bigoplus_{j=1}^n \vec{e}_j \otimes P[\Pi(\vec{\tau}_j)]^T$ is invertible. The vector space $V_3$ is known as the "enlarged sample space." The inverse of the matrix creates a mapping into the ideal sample space $V_4 \cong \mathbb{R}^n$.

$$M^{-1,T}: V_3 \to V_4. \quad \text{(Eq. 27)}$$

Regular Operation: Given any test sample $\vec{\tau} \in V_1$, the test sample is mapped into the reduced sample space as $\Pi(\vec{\tau}) \in V_2$; and then, by the polynomial map into the enlarged sample space $P \cdot \Pi(\vec{\tau}) \in V_3$. Finally, the inverse of the extension map is employed to get into the ideal space:

$$\vec{t} = M^{-1,T} \cdot P \cdot \Pi(\vec{\tau}) \quad \text{(Eq. 28)}$$

On this "ideal sample", the conical-spherical neural net is used, and returns with the answer about its proximity to the other ideal cases.

Proof of Theorem: By induction, it is assumed that for any index q that satisfies 0≤q<n−k, a matrix $M_{(q)}$ results that has the form:

$$M_{(q)} = \begin{bmatrix} p_q(\vec{\tau}_1) & \cdots & p_1(\vec{\tau}_1) & \vec{\tau}_1^T \\ \vdots & & \vdots & \vdots \\ p_q(\vec{\tau}_n) & \cdots & p_1(\vec{\tau}_n) & \vec{\tau}_n^T \end{bmatrix}. \quad \text{(Eq. 29)}$$

In greater detail, the final column on the right-hand side represents in shorthand, the sample matrix S of size n×k. For q=0, this is all that there is in the matrix $M_{(0)}$=S. On the left-hand side, there are q columns, each of which has row entries that depend upon a single polynomial $p_i(\vec{x})$ of the k-variables in the arbitrary vector $\vec{x} \in \mathbb{R}^k$. Here, the index i lies in the range 0≤i≤q. Furthermore, the $j^{th}$ row entry of the $i^{th}$ column employs the evaluation $\vec{x} = \vec{\tau}_j$. The inductive assumption about $M_{(q)}$ is that it has maximal rank. That matrix has size n×(q+k) and our assumption is that n≥q+k; hence the rank of $M_{(q)}$ must be q+k.

The inductive assumption is satisfied for q=0 since $M_{(0)}$=S has maximal rank as a consequence of the hypothesis of theorem (2.3). The objective of this appendix is to pass from $M_{(q)}$ to $M_{(q+1)}$.

It is permissible to rearrange the rows of $M_{(q)}$ so that there is a maximal rank sub-block in the rows 2, ..., q+k+1. This is clearly possible as long as q<n−k. This block is denoted as B. Next, a $(q+1)^{th}$ column is adjoined to $M_{(q)}$ on its left-hand side. This will involve an unknown polynomial $p_{q+1}(\vec{x})$ that will be chosen shortly (as before the $j^{th}$ row is evaluated upon $\vec{\tau}_j$). The sub-block $\tilde{B}$ of this new matrix is defined to be its first q+k+1 rows. As the new matrix has q+k+1 columns, this is the entire top part of the new matrix. By a column expansion along the newly adjoined column:

$$det(\tilde{B}) = p_{q+1}(\vec{\tau}_1) \cdot det(B) + E(\vec{\tau}_1). \quad \text{(Eq. 30)}$$

The extra term $E(\vec{\tau}_1)$ only involves the entries of the first row of $M_{(q)}$ in a linear fashion. Thus, its maximum order as a polynomial in the variable $\vec{\tau}_1$ is the maximum of the orders of previously chosen polynomials $\{p_1, \ldots, p_q\}$. The leading coefficient, det(B), does not involve the variable $\vec{\tau}_1$; and values of the other variables $\{\vec{\tau}_2, \ldots, \vec{\tau}_n\}$ are chosen such that it is non-zero.

By selecting the polynomial $p_{q+1}(\vec{x})$ to have an order that is larger than the order of $E(\vec{\tau}_1)$, it is clear that the expression det($\tilde{B}$) will be a non-trivial polynomial. In other words, it will vanish on a proper sub-variety. This is precisely what is needed to establish the inductive step.

For m>n, there is really nothing to prove since a sub-block of maximal rank is already determined. Example (2.6) exhibits a situation in which two maximal sub-blocks are generated by the procedure. Notice that these are created by the basic matrix S with one of two extra columns attached. Each of these columns involve a polynomial of the same order.

The above proof demonstrates why the Vandermonde example employs a set of monomials that increase by one order with each additional column. It suggests that it is only necessary to increase by one order for each new column, in spite of the dimension of the sample space. The actual choice of monomials will be handled in the future.

Decomposition of Matrices by their Rank: By assumption, all of the samples lie in some sub-space of dimension r; hence, there must be that many samples which are linearly independent. The matrix S is organized so that these are the first r rows. This yields an r×k sub matrix at the top of the matrix S. It must have r columns that form an r×r sub matrix with non-zero determinant By permutations, those columns are arranged to occupy the first r columns of the matrix S. The situation is shown by the next formula, using the sub-block notation:

$$S_{n \times k} = \begin{bmatrix} R_{r \times r} & X_{r \times h} \\ Y_{l \times r} & Z_{l \times h} \end{bmatrix}. \quad \text{(Eq. 31)}$$

The subscripts on the individual blocks indicate their respective dimensions, where the shorthand l≡n−r and h≡k−r is employed. In particular, the square sub-block R has the non-zero determinant.

The development depends upon Kramer's rule; so, the material in the context of the matrix R is reviewed. The cofactors of a matrix R are indexed by the indicial positions (j,k) in that matrix. The cofactor at this position is the determinant of the (r−1)×(r−1) sub-block extracted from R by removing its $j^{th}$ row and $k^{th}$ column:

$$Cof(R)_{j,k} \equiv det \begin{bmatrix} r_{\alpha,p} & r_{\alpha,q} \\ r_{\beta,p} & r_{\beta,q} \end{bmatrix} \text{ where } \begin{array}{l} 1 \leq \alpha \leq j-1, \\ j+1 \leq \beta \leq r, \\ 1 \leq p \leq k-1, \\ k+1 \leq q \leq r. \end{array} \quad \text{(Eq. 32)}$$

(Parenthetically, one skilled in the art appreciates that the last inequalities are only valid for indices j and k that are strictly within the interior of the matrix. There are similar inequalities at the "edges" of the matrix.) The basic result is that the entries of the inverse matrix $R^{-1}$ come from the transpose of the matrix of signed cofactors, which are labeled Q. The entries of the latter matrix are denoted as:

$$Q_{j,k} \equiv (-1)^{j+k} \cdot Cof(R)_{k,j}. \quad \text{(Eq. 33)}$$

More precisely, the next valid result is:

$$Q \cdot R = det(R) \cdot I_{r \times r}. \quad \text{(Eq. 34)}$$

To prove the above, an arbitrary entry of the matrix on the left-hand side is considered:

$$[Q \cdot R]_{\alpha,\beta} = \Sigma_{\gamma=1}^r Q_{\alpha,\gamma} \cdot r_{\gamma,\beta} = \Sigma_{\gamma=1}^r (-1)^{\alpha+\beta} \cdot Cof(R)_{\gamma,\alpha} \cdot r_{\gamma,\beta}. \quad \text{(Eq. 35)}$$

The above is the a column expansion of some r×r matrix that is obtained from the matrix R by replacing its $\alpha^{th}$ column by its $\beta^{th}$ column. When α=β, the result is det(R); and when otherwise, α≠β, there are two repeated columns in the new matrix, and thus, its determinant is zero.

Returning now to the block decomposition of the matrix S as shown in (see Eq. 32). Because R is invertible, a matrix N of size r×h is defined for which R·N=X. The same reasoning enables us to find a matrix P of size l×r such that P·R=Y. The sub-matrix Z requires greater subtlety. An arbitrary entry in it can be said to inherit labels from the full matrix S; that is, it may be labelled as $s_{\alpha,\beta}$ for r+1≤α≤n and r+1≤β≤k. Next, examine the (r+1)×(r+1) sub-matrix, W, defined by R and the element $s_{\alpha,\beta}$ of Z just defined:

$$W \equiv \begin{bmatrix} & & & s_{1,\beta} \\ & R & & \vdots \\ & & & s_{r,\beta} \\ s_{\alpha,1} & \cdots & s_{\alpha,r} & s_{\alpha,\beta} \end{bmatrix}. \qquad \text{(Eq. 36)}$$

On the one hand, because S has rank r, the determinant of any such sub-block is known to be zero. On the other hand, this determinant may be expanded along the bottom row to obtain:

$$0 = det(W) = \Sigma_{p=1}^{r}(-1)^{r+p+2} \cdot s_{\alpha,p} \cdot Cof(W)_{r+1,p} + (-1)^{2 \cdot (r+1)} \cdot s_{\alpha,\beta} \cdot det(R). \qquad \text{(Eq. 37)}$$

A study of the cofactors $Cof(W)_{r+1,p}$ that appear in this formula. The $p^{th}$ column of R has been removed, and the column vector $(s_{1,\beta}, \ldots, s_{r,\beta})^T$ was inserted on the right-hand side. In point of fact, this is a column of the sub-matrix X is labeled as $x_{*,\beta-r}$. (The asterisk refers to a set of running row indices that are not important for the present argument). Now, that column vector is passed over r−p−1 columns to put it into the $p^{th}$ column of R. By consideration of Kramer's formula, this results in:

$$Cof(W)_{r+1,p} = (-1)^{r-p-1} \cdot det(R) \cdot [R^{-1}(x)]_p. \qquad \text{(Eq. 38)}$$

The bottom row of the matrix W has been written as $(s_{\alpha,1}, \ldots, s_{\alpha,r})$; but employing the asterisk notation it is also seen to be a row of the sub-matrix Y. Specifically, it is $y_{\alpha-r,*}$. This means that the equation for det(W) can be transformed into the next expression:

$$s_{\alpha,\beta} \cdot det(R) = \Sigma_{\gamma=1}^{r} y_{\alpha-r,\gamma} \cdot [R^{-1}(x_{*,\beta-r})]_\gamma \qquad \text{(Eq. 39)}$$

However, this is just the scalar product $\langle (y_{\alpha-r,*}), R^{-1}(x_{*,\beta-r}) \rangle$; and on the level of sub-blocks in the matrix S, it is simply the matrix product $Z = Y \cdot R^{-1} \cdot X = P \cdot R \cdot N$. These considerations are summarized in the next decomposition statement.

Accordingly, if the matrix S has rank r, there is an r×r invertible matrix R for which the following matrix factorization is valid:

$$S = \begin{bmatrix} I \\ P_{l \times r} \end{bmatrix} \cdot R \cdot [I \; N_{r \times h}]. \qquad \text{(Eq. 40)}$$

It should be emphasized that the above-described embodiments of the content segment obscuring system 100 are merely possible examples of implementations of the invention. Many variations and modifications may be made to the above-described embodiments. All such modifications and variations are intended to be included herein within the scope of this disclosure and protected by the following claims.

The invention claimed is:

1. A media device, comprising:
 a content stream interface configured to receive a first media content stream,
  wherein the first media content stream includes a first media content event of interest,
  wherein the first media content stream is segmented into at least a first content segment followed by a second content segment, and
  wherein an intervening content segment is between the first content segment and the second content segment;
 a processor system communicatively coupled to the content stream interface, wherein the processor system is configured to:
  receive the first media content stream, and
  output a decoded stream of information, wherein the decoded stream of information comprises at least one of a stream of video information and a stream of audio information;
 a program buffer communicatively coupled to the processor system,
  wherein the program buffer receives the decoded stream of information from the processor system,
  wherein portions of the decoded stream of information are stored in the program buffer for a predefined duration,
  wherein the respective portions of the decoded stream of information are output to a media presentation system for presentation, and
  wherein the at least one of the stream of video information and the stream of audio information is presentable to a user by the media presentation system; and
 a content segment obscuring system configured to:
  sample the decoded stream of information corresponding to an initial portion of the intervening content segment,
  determine a vector signature of the sampled initial portion of the intervening content segment, wherein the vector signature corresponds to at least one location and an orientation of a vector in a multi-dimensional vector space, and
  compare the vector signature with a plurality of predefined reference vector signatures,
 where in response to the vector signature substantially corresponding to at least one of the plurality of predefined reference vector signatures, the intervening content segment is obscured with replacement content,
 wherein the replacement content is presentable to the user instead of the obscured intervening content segment,
 wherein when the replacement content is an image that has been previously selected by the user, the processor system is further configured to:
  retrieve the user-selected image from a memory;
  present the user-selected image at a conclusion of the first content segment;
  end presentation of the user-selected image at the conclusion of a duration of the intervening content segment; and
  resume presentation of the first media content event with an initial portion of the second content segment,
 wherein when the replacement content is a currently received portion of a second media content event received in a second media content stream that is concurrently receivable at the media device with the first media content stream, and wherein the second media content event has been previously selected by the user, the processor system is further configured to:
  operate a tuner of the media device to receive the second media content event;
  present the currently received portion of the second media content event during the duration of the first content segment;
  end presentation of the currently received portion of the second media content event at the conclusion of the duration of the intervening content segment; and
  resume presentation of the media content event with the initial portion of the second content segment, and wherein when the replacement content is an alternative intervening content segment that has been previously stored, and wherein the alternative intervening content segment has been previously selected by one of the user or another party, the processor system is further configured to:
retrieve the selected portion of the second media content event from the memory;
present the selected alternative intervening content segment at a conclusion of the first content segment;
end presentation of the selected alternative intervening content segment at the conclusion of a duration of the intervening content segment; and
resume presentation of the first media content event with an initial portion of the second content segment.

2. The media device of claim 1, wherein the determined vector signature of the sampled initial portion of the intervening content segment is $\vec{x}^T$, wherein $\vec{x}^T$ is:

$$\vec{x}^T = (x_1, x_2, \ldots, x_k).$$

3. The media device of claim 1, wherein comparing the vector signature with a plurality of predefined reference vector signatures determines that vector signature substantially corresponds to at least one of the plurality of predefined reference vector signatures when the at least one location and the orientation of the vector in the multi-dimensional vector space for the determined vector signature at least substantially corresponds to a location and an orientation of a reference vector in the multi-dimensional vector space for at least one reference vector signature.

4. The media device of claim 3, wherein the location and orientation of the vector in the multi-dimensional vector space for the determined vector signature at least substantially corresponds to the location and the orientation of the reference vector of the at least one reference vector signature when the vector of the determined vector signature is within a cone about the location and the orientation of the reference vector of the reference vector signature, wherein the cone is defined by a predefined half angle about some predefined fixed angle.

5. The media device of claim 1, wherein the decoded stream of information is a stream of binary information, wherein the sampled initial portion of the intervening content segment is a sample of the binary information, and wherein the vector signature is determined from the sampled stream of binary information.

6. The media device of claim 1, further comprising:
the memory,
wherein the memory comprises a portion that stores the plurality of predefined reference vector signatures.

7. The media device of claim 1, further comprising:
the memory,
wherein the memory comprises a portion that stores the replacement content.

8. The media device of claim 1, wherein the content segment obscuring system comprises:
a sampling buffer that stores the sampled initial portion of the intervening content segment;
a content segment sampler processor system communicatively coupled to the sampling buffer, wherein the content segment sampler processor system determines the vector signature of the sampled initial portion of the intervening content segment; and
the memory, wherein the memory comprises a portion that stores the replacement content.

9. The media device of claim 8, wherein the memory further comprises another portion that stores the plurality of predefined reference vector signatures.

10. The media device of claim 1, further comprising:
a time delay circuit that delays communication of the decoded stream of information through the program buffer so that the content segment obscuring system has sufficient time to determine the vector signature from the sampled initial portion of the intervening content segment, compare the vector signature with the plurality of predefined reference vector signatures, and obscure the intervening content segment when the vector signature substantially corresponds to at least one of the plurality of predefined reference vector signatures.

11. A media device, comprising:
a content stream interface configured to receive a first media content stream and a second media content stream that is received after a conclusion of the first media content stream,
wherein the first media content stream includes a first media content event of interest,
wherein the first media content stream is segmented into at least a first content segment followed by a second content segment,
wherein an intervening content segment is between the first content segment and the second content segment,
wherein the second media content stream includes a second media content event of interest that is different from the first media content event,
wherein the second media content stream is segmented into at least a third content segment followed by a fourth content segment,
wherein the intervening content segment is between the third content segment and the fourth content segment;
a processor system communicatively coupled to the content stream interface, wherein the processor system is configured to:
receive the first media content stream and the second media content stream, and
output a first decoded stream of information based on the first media content stream, wherein the decoded stream of information comprises at least one of a first stream of video information and a first stream of audio information, and
output a second decoded stream of information based on the second media content stream, wherein the second decoded stream of information comprises at least one of a second stream of video information and a second stream of audio information;
a program buffer communicatively coupled to the processor system,
wherein the program buffer receives the first decoded stream of information from the processor system when the first media content event is being presented, wherein portions of the first decoded stream of information are stored in the program buffer for a predefined duration, wherein the respective portions of the first decoded stream of information are output to a media presentation system for presentation, and wherein the at least one of the first stream of video information and the first stream of audio information is presentable to a user by the media presentation system, and wherein the program buffer receives the second decoded stream of information from the processor system when the second media content event is being presented, wherein portions of the second decoded stream of information are stored in the program buffer for a predefined duration, wherein the respective portions of the second decoded stream of information are output to the media presentation system for presentation, and wherein the at least one of the second stream of video information and the second stream of audio information is presentable to the user by the media presentation system; and a content segment obscuring system configured to:
sample the first decoded stream of information corresponding to an initial portion of the intervening content segment;
determine a first vector signature for the intervening content segment received in the first media content stream, wherein the first vector signature corresponds to at least one location and an orientation of a vector in a multi-dimensional vector space;
save the determined first vector signature as one of a plurality of predefined reference vector signatures in response to receiving a user selection that identifies the intervening content segment received in the first media content stream as being an obscured content segment that is to be obscured if received at the media device at a later time;
sample the second decoded stream of information corresponding to the initial portion of the intervening content segment,
determine a second vector signature of the sampled initial portion of the intervening content segment, wherein the second vector signature corresponds to the at least one location and the orientation of the vector in the multi-dimensional vector space, and
compare the second vector signature with a plurality of predefined reference vector signatures that includes the first vector signature,
where in response to the second vector signature substantially corresponding to the first vector signature, the intervening content segment in the received second media content stream is obscured with replacement content while the second media content event is being presented to the user,
wherein the replacement content is presentable to the user instead of the obscured intervening content segment.

12. The media device of claim 11, wherein at the earlier time before the media content stream with the intervening content segment is received, the content segment obscuring system is further configured to:
save the determined vector signature determined for the currently received intervening content segment for at least a predefined holdover duration after a conclusion of the intervening content segment,
wherein the determined vector signature is deleted after expiration of the predefined holdover duration if the user selection is not received.

13. The media device of claim 11, wherein the media device further comprises:
a remote interface configured to receive a wireless signal from a remote control, wherein the wireless signal includes information corresponding to the user selection that identifies the currently received intervening content segment as being the obscured content segment that is to be obscured if received at the media device at the later time.

14. The media device of claim 11, wherein the media device is configured to receive a wireless signal from a smart phone, wherein the wireless signal includes information corresponding to the user selection that identifies the currently received intervening content segment as being the obscured content segment that is to be obscured if received at the media device at the later time.

15. A method, comprising:
receiving a media content stream at a media device,
wherein the media content stream includes a media content event of interest,
wherein the media content stream is segmented into at least a first content segment followed by a second content segment, and
wherein at least one intervening content segment is between the first content segment and the second content segment;
outputting a decoded stream of information corresponding to the media content stream, wherein the decoded stream of information comprises at least one of a stream of video information and a stream of audio information;
buffering the decoded stream of information,
wherein portions of the decoded stream of information are buffered in a program buffer of the media device for a predefined duration,
wherein the respective portions of the decoded stream of information are output from the media device to a media presentation system for presentation, and
wherein at least one of the stream of video information and the stream of audio information is presentable to a user by the media presentation system;
sampling the decoded stream of information corresponding to an initial portion of the intervening content segment;
determining a vector signature of the sampled initial portion of the intervening content segment, wherein the vector signature corresponds to at least one location and an orientation of a vector in a multi-dimensional vector space;
comparing the vector signature with a plurality of predefined reference vector signatures; and
obscuring the intervening content segment with replacement content in response to the vector signature substantially corresponding to at least one of the plurality of predefined reference vector signatures,
wherein the replacement content is presentable to the user instead of the obscured intervening content segment,
wherein when the replacement content is an image that has been previously selected by the user, the method further comprises:
retrieving the user-selected image from a memory;
presenting the user-selected image at a conclusion of the first content segment;
ending presentation of the user-selected image at the conclusion of a duration of the intervening content segment; and
resuming presentation of the first media content event with an initial portion of the second content segment,
wherein when the replacement content is a currently received portion of a second media content event received in a second media content stream that is concurrently receivable at the media device with the first media content stream, and wherein the second media content event has been previously selected by the user, the method further comprises:

operating a tuner of the media device to receive the second media content event;
presenting the currently received portion of the second media content event during the duration of the first content segment;
ending presentation of the currently received portion of the second media content event at the conclusion of the duration of the intervening content segment; and
resuming presentation of the media content event with the initial portion of the second content segment, and
wherein when the replacement content is an alternative intervening content segment that has been previously stored, and wherein the alternative intervening content segment has been previously selected by one of the user or another party, the method further comprises:
retrieving the selected alternative intervening content segment from the memory;
presenting the selected alternative intervening content segment at a conclusion of the first content segment;
ending presentation of the selected alternative intervening content segment at the conclusion of a duration of the intervening content segment; and
resuming presentation of the first media content event with an initial portion of the second content segment.

16. The method of claim 15, wherein the determined vector signature of the sampled initial portion of the intervening content segment is $\vec{x}^T$, wherein $\vec{x}^T$ is:

$$\vec{x}^T = (x_1, x_2, \ldots, x_k).$$

17. The method of claim 15, wherein comparing the vector signature with a plurality of predefined reference vector signatures comprises:
determining that vector signature substantially corresponds to at least one of the plurality of predefined reference vector signatures when the location and orientation of the vector in the multi-dimensional vector space for the determined vector signature at least substantially corresponds to a location and an orientation of a reference vector in the multi-dimensional vector space for at least one reference vector signature.

18. The media device of claim 17, wherein the location and orientation of the vector in the multi-dimensional vector space for the determined vector signature at least substantially corresponds to the location and the orientation of the reference vector of the at least one reference vector signature when the vector of the determined vector signature is within a cone about the location and the orientation of the reference vector of the reference vector signature, wherein the cone is defined by a predefined half angle about some predefined fixed angle.

19. The method of claim 15, wherein at an earlier time before the media content stream with the intervening content segment is received, the method comprising:
determining a vector signature for a currently received intervening content segment; and
saving the determined vector signature as one of the plurality of predefined reference vector signatures in response to receiving a user selection that identifies the currently received intervening content segment as being an obscured content segment that is to be obscured if received at the media device at a later time.

20. The method of claim 19, wherein at the earlier time before the media content stream with the intervening content segment is received, the method further comprising:
saving the determined vector signature determined for the currently received intervening content segment for at least a predefined holdover duration after a conclusion of the intervening content segment,
wherein the determined vector signature is deleted after expiration of the holdover duration if the user selection is not received.

* * * * *